(12) United States Patent
Cheong et al.

(10) Patent No.: US 11,706,599 B2
(45) Date of Patent: *Jul. 18, 2023

(54) ELECTRONIC DEVICE FOR TRANSMITTING RESPONSE MESSAGE IN BLUETOOTH NETWORK ENVIRONMENT AND METHOD THEREOF

(71) Applicant: Samsung Electronics Co., Ltd., Suwon-si (KR)

(72) Inventors: Gupil Cheong, Suwon-si (KR); Jesus Manuel Perez Pueyo, Suwon-si (KR); Doosuk Kang, Suwon-si (KR); Doosu Na, Suwon-si (KR); Sungjun Choi, Suwon-si (KR); Jongmu Choi, Suwon-si (KR); Bokun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/512,994

(22) Filed: Oct. 28, 2021

(65) Prior Publication Data

US 2022/0053310 A1 Feb. 17, 2022

Related U.S. Application Data

(63) Continuation of application No. 16/801,597, filed on Feb. 26, 2020, now Pat. No. 11,166,140.

(30) Foreign Application Priority Data

Mar. 5, 2019 (KR) .................. 10-2019-0025337

(51) Int. Cl.
*H04W 4/80* (2018.01)
*H04W 76/15* (2018.01)
*H04L 1/1812* (2023.01)

(52) U.S. Cl.
CPC ............. *H04W 4/80* (2018.02); *H04L 1/1812* (2013.01); *H04W 76/15* (2018.02)

(58) Field of Classification Search
CPC ........ H04W 4/80; H04W 76/15; H04L 1/1812
(Continued)

(56) References Cited

U.S. PATENT DOCUMENTS 7,383,452 B2 * 6/2008 Veselic .................. G06F 1/266
710/72
7,697,419 B1 * 4/2010 Donthi .................... H04L 41/22
370/386
(Continued)

FOREIGN PATENT DOCUMENTS

KR 10-2017-0016883 A 2/2017

OTHER PUBLICATIONS

Partial European Search Report dated Jun. 9, 2020, issued in European Patent Application No. 20160460.0.
(Continued)

*Primary Examiner* — Hai V Nguyen
(74) *Attorney, Agent, or Firm* — Jefferson IP Law, LLP

(57) ABSTRACT

An electronic device is provided. The electronic device includes a wireless communication circuit that supports a Bluetooth network, at least one processor operatively connected to the wireless communication circuit, and a memory operatively connected to the at least one processor. The memory stores instructions that, when executed, cause the at least one processor, through the wireless communication circuit, to generate a first link with a first external electronic device based on the Bluetooth network, generate a second link with a second external electronic device based on the Bluetooth network, transmit information to the second external electronic device through the second link, wherein the information is used by the second external electronic device (Continued)

to monitor the first link, negotiate timing for transmitting a response message with the second external electronic device, receive a data packet from the first external electronic device, and transmit a response message to the first external electronic device in response to the data packet based on the negotiated timing.

12 Claims, 15 Drawing Sheets

(58) Field of Classification Search
USPC .......................................................... 455/41.2
See application file for complete search history.

(56) References Cited

U.S. PATENT DOCUMENTS

| | | | |
|---|---|---|---|
| 7,706,338 | B2 | 4/2010 | Kondylis et al. |
| 8,073,398 | B2 | 12/2011 | Steer |
| 8,321,741 | B2 | 11/2012 | Wei et al. |
| 8,768,252 | B2 | 7/2014 | Watson et al. |
| 8,781,408 | B2 | 7/2014 | Steer |
| 9,020,437 | B2 | 4/2015 | Watson et al. |
| 9,100,279 | B2 | 8/2015 | Ge |
| 9,179,475 | B2 | 11/2015 | Koleszar et al. |
| 9,515,756 | B2* | 12/2016 | Khoury ................ H04J 3/0667 |
| 9,712,266 | B2 | 7/2017 | Linde et al. |
| 9,924,304 | B2 | 3/2018 | Yu et al. |
| 10,136,291 | B2* | 11/2018 | Weiss ..................... H04W 4/80 |
| 10,136,429 | B2 | 11/2018 | Lee et al. |
| 10,149,340 | B1 | 12/2018 | Rabii et al. |
| 10,178,711 | B2 | 1/2019 | Li et al. |
| 10,405,369 | B2 | 9/2019 | Rabii et al. |
| 10,602,397 | B2* | 3/2020 | Gostev ................. H04W 84/18 |
| 10,681,773 | B2 | 6/2020 | Li et al. |
| 10,819,489 | B2 | 10/2020 | Agarwal et al. |
| 10,834,738 | B2 | 11/2020 | Paycher et al. |
| 10,985,826 | B2 | 4/2021 | Oteri et al. |
| 11,005,584 | B2* | 5/2021 | Syväluoma .......... H04J 3/0641 |
| 11,166,140 | B2* | 11/2021 | Cheong ................ H04W 76/15 |
| 11,558,155 | B2* | 1/2023 | Linsky ...................... H04L 1/22 |
| 11,570,081 | B2* | 1/2023 | Chen .................. H04L 43/0888 |
| 2003/0190938 | A1* | 10/2003 | Ganton ................ H04W 52/00 455/574 |
| 2006/0018319 | A1 | 1/2006 | Palin et al. |
| 2006/0064730 | A1* | 3/2006 | Rael ...................... H04L 12/281 725/74 |
| 2006/0153152 | A1 | 7/2006 | Kondylis et al. |
| 2007/0008884 | A1 | 1/2007 | Tang |
| 2007/0198875 | A1* | 8/2007 | Jung .................. H04M 7/0096 714/51 |
| 2007/0237092 | A1* | 10/2007 | Balachandran ..... H04W 72/542 370/254 |
| 2008/0171520 | A1 | 7/2008 | Steer |
| 2009/0276674 | A1 | 11/2009 | Wei et al. |
| 2009/0316579 | A1 | 12/2009 | Tang |
| 2010/0020689 | A1 | 1/2010 | Tang |
| 2011/0128918 | A1 | 6/2011 | Zhai |
| 2012/0058727 | A1 | 3/2012 | Cook et al. |
| 2012/0063372 | A1 | 3/2012 | Steer |
| 2012/0136956 | A1* | 5/2012 | Khoury ................ H04J 3/0667 709/248 |
| 2012/0309306 | A1 | 12/2012 | Kim et al. |
| 2013/0083722 | A1 | 4/2013 | Bhargava et al. |
| 2013/0287031 | A1 | 10/2013 | Ge |
| 2014/0108344 | A1* | 4/2014 | Marsden ............... G06F 16/273 707/623 |
| 2014/0348327 | A1* | 11/2014 | Linde ..................... H04W 4/80 381/2 |
| 2016/0174137 | A1 | 6/2016 | Patil et al. |
| 2016/0316051 | A1 | 10/2016 | Hsieh |
| 2016/0337971 | A1 | 11/2016 | Bhargava et al. |
| 2017/0208424 | A1* | 7/2017 | Longjie ................. H04W 8/005 |
| 2017/0251469 | A1* | 8/2017 | Lee ................... H04W 72/0446 |
| 2018/0077493 | A1 | 3/2018 | Watson et al. |
| 2018/0084456 | A1* | 3/2018 | Gostev ................. H04L 1/1685 |
| 2018/0084606 | A1* | 3/2018 | Li ......................... H04W 88/04 |
| 2018/0256796 | A1* | 9/2018 | Hansen ............... A61M 60/148 |
| 2018/0295645 | A1 | 10/2018 | Yaver et al. |
| 2018/0352558 | A1* | 12/2018 | Paycher ............ H04W 72/1215 |
| 2019/0007153 | A1 | 1/2019 | Linsky et al. |
| 2019/0075611 | A1* | 3/2019 | Rabii .................... H04W 84/18 |
| 2019/0104424 | A1 | 4/2019 | Hariharan et al. |
| 2019/0159285 | A1* | 5/2019 | Li ......................... H04W 88/04 |
| 2019/0288763 | A1 | 9/2019 | Oteri et al. |
| 2019/0306878 | A1 | 10/2019 | Zhang et al. |
| 2020/0014576 | A1 | 1/2020 | Cherian et al. |
| 2020/0177348 | A1* | 6/2020 | Agarwal ................. H04L 1/1854 |
| 2020/0205031 | A1* | 6/2020 | Gostev ................. H04W 28/04 |
| 2020/0205192 | A1 | 6/2020 | Zhang et al. |
| 2020/0228218 | A1* | 7/2020 | Syväluoma ........... H04J 3/0667 |
| 2020/0288292 | A1* | 9/2020 | Cheong ................ H04L 1/1812 |
| 2022/0085939 | A1* | 3/2022 | Mondal ................ H04L 5/0048 |
| 2022/0095332 | A1* | 3/2022 | Li ....................... H04W 72/1268 |

OTHER PUBLICATIONS

International Search Report dated Jun. 24, 2020, issued in International Patent Application No. PCT/KR2020/002748.

Extended European Search Report dated Sep. 4, 2020, issued in European Patent Application No. 20160460.0.

* cited by examiner

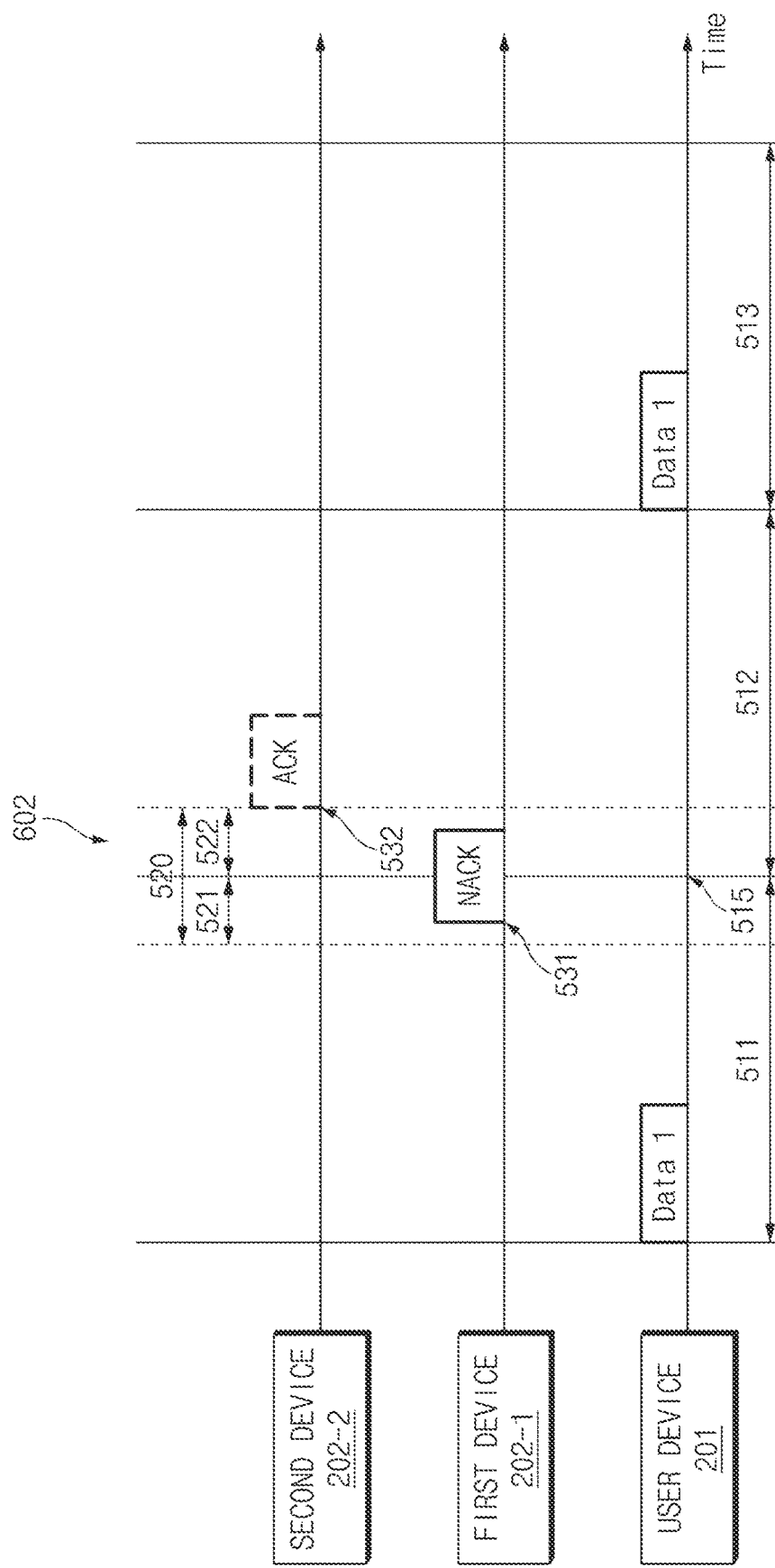

ELECTRONIC DEVICE FOR TRANSMITTING RESPONSE MESSAGE IN BLUETOOTH NETWORK ENVIRONMENT AND METHOD THEREOF

CROSS-REFERENCE TO RELATED APPLICATION(S)

This application is a continuation application of prior application Ser. No. 16/801,597, filed on Feb. 26, 2020, which is based on and claims priority under 35 U.S.C. § 119(a) of a Korean patent application number 10-2019-0025337, filed on Mar. 5, 2019, in the Korean Intellectual Property Office, the disclosure of which is incorporated by reference herein in its entirety.

BACKGROUND

1. Field

The disclosure relates to an electronic device for transmitting a response message in a Bluetooth network environment and a method thereof. More particularly, the disclosure relates to reducing transmission/reception consumption in a Bluetooth network environment by a device transmitting packets that are received directly or indirectly by multiple external devices.

2. Description of Related Art

The Bluetooth standard technology defined by the Bluetooth Special Interest Group (SIG) defines a protocol for short-range wireless communication between electronic devices. In a Bluetooth network environment, the electronic devices may transmit or receive data packets including contents such as text, voice, images, or video in a specified frequency band (e.g., about 2.4 GHz). For example, the data packet may include a packet data unit (PDU).

For example, a user equipment (UE) such as a smartphone, a tablet, a desktop computer, or a laptop computer may transmit data packets to other user terminals or accessory devices in a Bluetooth network environment. For example, the accessory device may include at least one of an earphone, a headset, a speaker, a mouse, a keyboard, or a display device.

The above information is presented as background information only to assist with an understanding of the disclosure. No determination has been made, and no assertion is made, as to whether any of the above might be applicable as prior art with regard to the disclosure.

SUMMARY

A topology representing a Bluetooth network environment may include one user device (e.g., a device under test (DUT)) transmitting a data packet and a plurality of devices receiving the data packet from the user device. For example, when an earphone (or a headset) is connected to a smartphone, the earphone worn on the left ear of a user and the earphone worn on the right ear of the user may receive a data packet from the smartphone.

Unless a plurality of devices receiving the data packets are wired to each other, the plurality of devices receiving the data packets may form separate links with the user device. In this case, because the user device is required to create a plurality of links in order to transmit data packets, the resource consumption and power consumption of the user device may occur, and complexity may increase. In addition, as the number of devices to which the user device is required to transmit data packets increases, the power consumption of the user device and the time for the data packet to reach the devices may increase.

Aspects of the disclosure are to address at least the above-mentioned problems and/or disadvantages and to provide at least the advantages described below. Accordingly, an aspect of the disclosure is to provide an electronic device for transmitting a response message in a Bluetooth network environment and a method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a wireless communication circuit that supports a Bluetooth network, at least one processor operatively connected to the wireless communication circuit, and a memory operatively connected to the at least one processor, wherein the memory stores instructions that, when executed, cause the at least one processor, through the wireless communication circuit, to generate a first link with a first external electronic device based on the Bluetooth network, generate a second link with a second external electronic device based on the Bluetooth network, transmit information to the second external electronic device through the second link, wherein the information is used by the second external electronic device to monitor the first link, negotiate timing for transmitting a response message with the second external electronic device, receive a data packet from the first external electronic device, and transmit a response message to the first external electronic device in response to the data packet based on the negotiated timing.

In accordance with another aspect of the disclosure, a system is provided. The system includes a first electronic device including a first wireless communication circuit, wherein the first wireless communication circuit establishes a wireless communication link with a source device, receives at least one packet data unit (PDU) from the source device, transmits a first acknowledgement (ACK) signal including a channel access code to the source device after receiving the at least one PDU, and a second electronic device including a second wireless communication circuit, wherein the second wireless communication circuit receives the at least one PDU from the source device while the first wireless communication circuit receives the at least one PDU in a state that the wireless communication link with the source device is not established, and starts to transmit a first negative ACK (NACK) signal including the channel access code before the first wireless communication circuit starts to transmit the first ACK signal when the first wireless communication circuit fails to receive the at least one PDU from the source device.

In accordance with another aspect of the disclosure, an electronic device is provided. The electronic device includes a wireless communication circuit that supports a Bluetooth network, at least one processor, and a memory operatively connected to the at least one processor, wherein the memory stores instructions that, when executed, cause the at least one processor, through the wireless communication circuit, to generate a first link with a first external electronic device based on the Bluetooth network, receive information related to a second link generated between the first external electronic device and a second external electronic device from the first external electronic device, negotiate timing for transmitting a response message with the first external electronic device, attempt to receive a data packet transmitted from the second external electronic device by monitoring the second link based on at least a piece of the information related to the second link, not transmit a response message when the data packet is normally received, and transmit a response message indicating a negative acknowledgement (NACK) to the second external electronic device at a first timing among the first timing and a second timing corresponding to a timing later than the first timing by a specified time based on the negotiated timing when the data packet is not normally received.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6B is a view illustrating another example of an operation of transmitting a response message at a specified timing according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
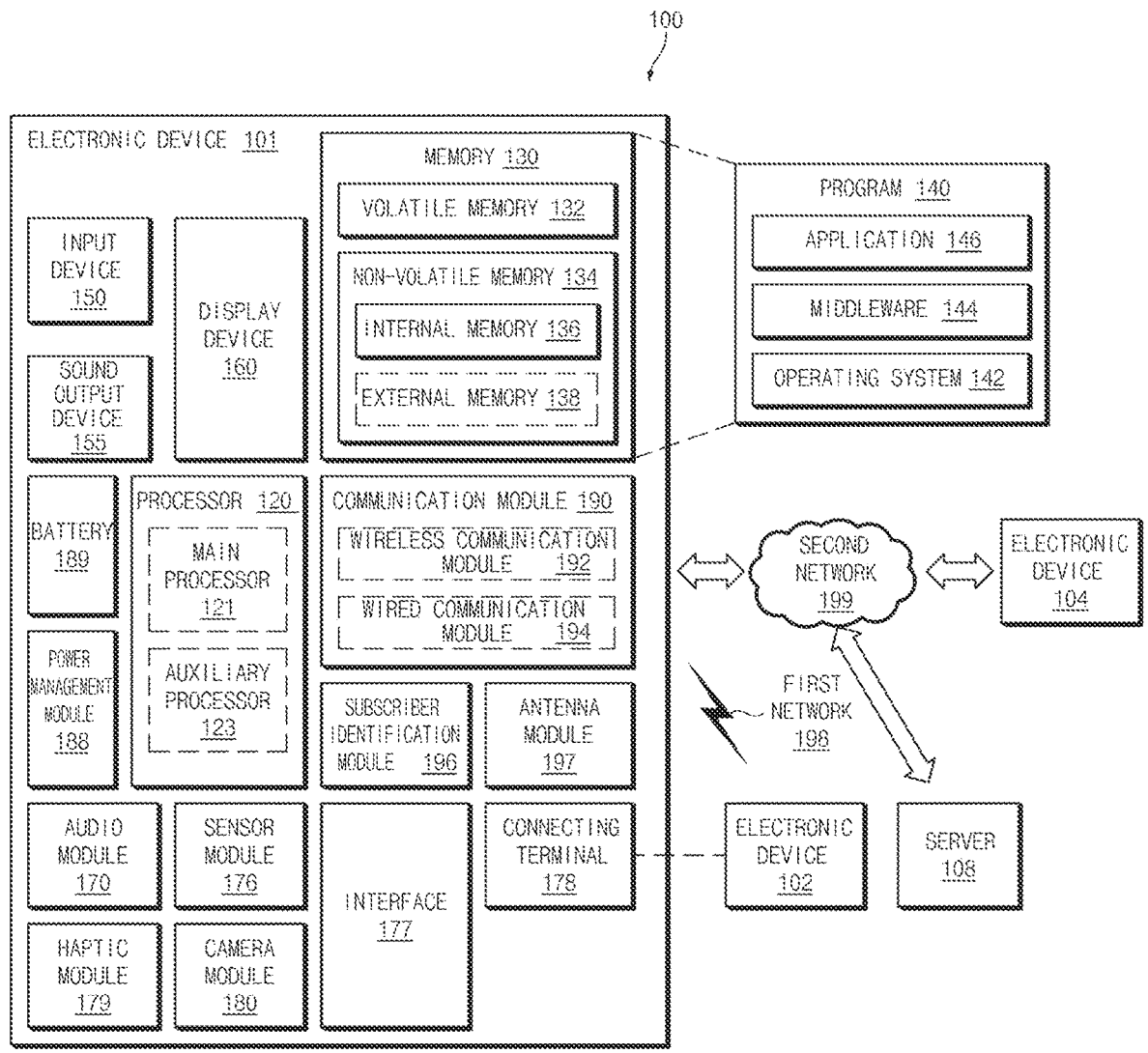
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture an image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
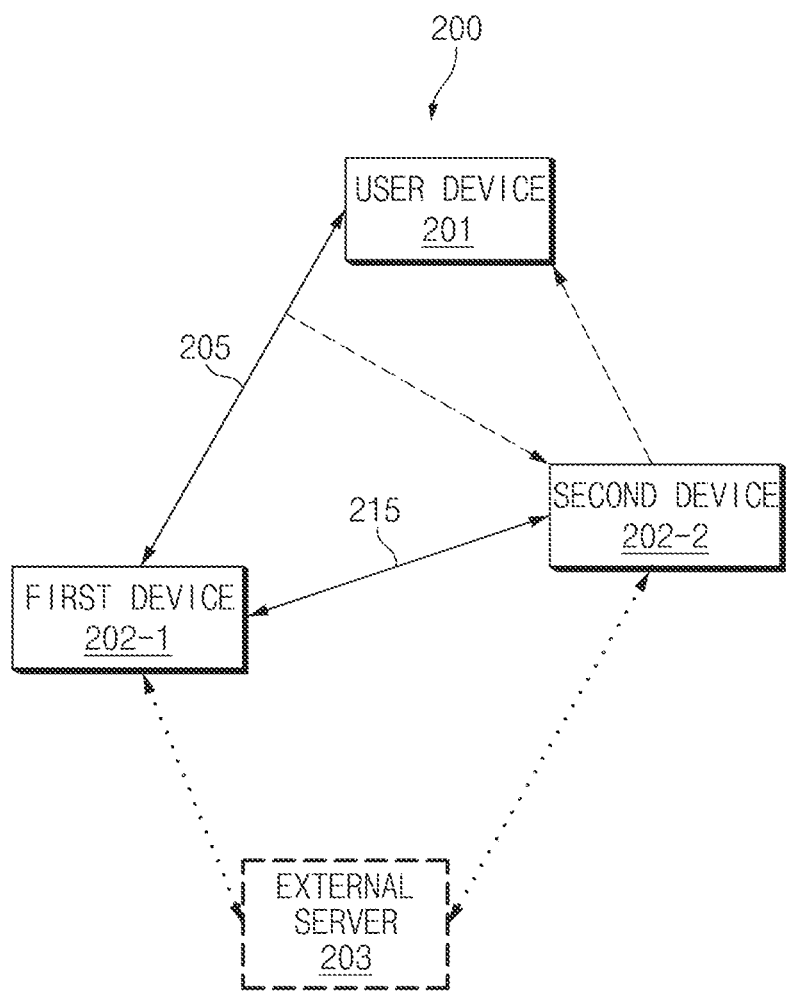
FIG. 2 illustrates a topology of a Bluetooth network environment according to an embodiment of the disclosure.

FIG. 2 illustrates a topology of a Bluetooth network environment according to an embodiment of the disclosure.

Referring to FIG. 2, a user device 201 and devices 202-1 and 202-2 included in a topology 200 may include a component which is at least partially the same as or similar to the electronic device 101 shown in FIG. 1, and may perform a function which is at least partially the same as or similar to that of the electronic device 101. For example, the user device 201 and the devices 202-1 and 202-2 may perform wireless communication in a short range through a Bluetooth network defined by the Bluetooth SIG. The Bluetooth network may include, for example, a Bluetooth legacy network and a Bluetooth low energy (BLE) network. According to an embodiment, the user device 201 and the devices 202-1 and 202-2 perform wireless communication through one of the Bluetooth legacy network and the BLE network, or perform wireless communication through both networks.

The user device 201 may include, for example, a user terminal such as a smartphone, a tablet, a desktop computer, or a laptop computer, and the devices 202-1 and 202-2 may include an accessory device such as an earphone, a headset, a speaker, a mouse, a keyboard, or a display device. According to an embodiment, each of the devices 202-1 and 202-2 may recognize a counterpart device (e.g., the first and second devices 202-1 and 202-2) in advance, or may store information (e.g., address information) about the counterpart device in advance. For example, when the first and second devices 202-1 and 202-2 constitutes one set of accessory devices (e.g., an earphone), the first and second devices 202-1 and 202-2 may recognize each other in advance or store address information of each other in advance.

According to an embodiment, the user device 201 may serve as a master device, and the first or second device 202-1 or 202-2 may perform a function of a slave device. The number of devices that perform functions of slave devices is not limited to the example shown in FIG. 2. According to an embodiment, the function of a device may be determined by a procedure in which a link (e.g., 205 or 215) between devices is generated. According to another embodiment, one (e.g., the first device 202-1) of the first and second devices 202-1 and 202-2 may serve as a master device, and the other (e.g., the second device 202-2) may serve as a slave device.

The master device may control a physical channel. For example, the master device may transmit a data packet, while the slave device may transmit a data packet to the master device only after receiving a data packet. As another example, a channel resource (e.g., a frequency hopping channel) for transmitting data packets may be generated based on a clock of the master device. In a Bluetooth legacy network, a time resource (e.g., a time slot) may be determined based on the clock of the master device. The time slot may be, for example, 625 microseconds (µs). In the BLE network, the master and slave devices may transmit data packets every specified interval, and respond after a specified time (e.g., the inter frame space (T_IFS), or about 150 µs) when the data packet is received.

According to an embodiment, the user device 201 may transmit data packets including contents such as a text, a voice, an image, or a video to the devices 202-1 and 202-2. According to a type of contents included in the data packet, not only the user device 201 but also at least one of the devices 202-1 and 202-2 may transmit a data packet. For example, when music is played on the user device 201, data packets may be transmitted only by the user device 201, but at least one device 202-1 or 202-2 as well as the user device 201 may transmit a data packet including contents (e.g., voice data) when a call is performed on the user device 201. When only the user device 201 transmits a data packet, the user device 201 may be referred to as a source device, and the devices 202-1 and 202-2 may be referred to as sink devices.

When the user device 201 creates (or establishes) a plurality of links with the devices 202-1 and 202-2 to transmit a data packet, because the resource and power consumption of the user device 201 may increase, the user device 201 may form only the first link 205 with the first device 202-1 to transmit a data packet through the first link 205. At least one other device (e.g., 202-2) may monitor the first link 205 to receive a data packet containing contents. In this case, the user device 201 may be referred to as a device under test (DUT), the first device 202-1 may be referred to as a primary earbud (PE) or primary equipment (PE), and at least one other device (e.g., 202-2) may be referred to as a secondary earbud (SE) or secondary equipment (SE).

According to an embodiment, the first device 202-1 may create the second link 215 with the second device 202-2. The first device 202-1 may transmit information related to the first link 205 to the second device 202-2 through the second link 215 to allow the second device 202-2 to monitor the first link 205 and transmit a response message to the user device 201. The information related to the first link 205 may include address information (e.g., the Bluetooth address of the master device of the first link 205, the Bluetooth address of the user device 201, and/or the Bluetooth address of the first device 202-1), piconet clock information (e.g., clock native (CLKN) of the master device of the first link 205), logical transport (LT) address information (e.g., information assigned by the master device of the first link 205), used channel map information, link key information, service discovery protocol (SDP) information (e.g., service and/or profile information related to the first link 205), and/or supported feature information. For example, the information related to the first link 205 may further include an extended inquiry response (EIR) packet. The EIR packet may include resource control information of the first link 205 and/or information about a manufacturer. The second device 202-2 may determine a hopping channel (or a frequency hopping channel) of the first link 205 through the address information and the clock information, and decrypt a data packet encrypted with the key information. The second device 202-2 may use the information received from the first device 202-1 (e.g., information related to the first link 205), such that the second device 202-2 receives the data packet from the user device 201 even if a link with the user device 201 is not generated.

According to another embodiment, when the first and second devices 202-1 and 202-2 support the same user account or similar user account (e.g., a family account), the first and second devices 202-1 and 202-2 may share information related to the first link 205 through an external device (e.g., an external server 203) which interworks with the first or second device 202-1 or 202-2 through the same or similar user account. In this case, the topology 200 may further include the external server 203. For example, the first device 202-1 may transmit information related to the first link 205 to the external server 203, and the external server 203 may transmit information related to the first link 205 to the second device 202-2.

According to another embodiment, the second device 202-2 may share information related to the first link 205 with the user device 201. For example, the user device 201 may transmit information related to the first link 205 to the second device 202-2 through a separate link (not shown), and when the information related to the first link 205 is transmitted, the separate link (not shown) may be released.

According to an embodiment, the first or second device 202-1 or 202-2 may transmit a response message to notify that the data packet has been normally received. The response message may include a positive acknowledgment (ACK) message indicating that the data packet is normally received and a negative acknowledgment (NACK) message indicating that the data packet is not normally received or the received data packet is not normally processed. For example, the response message may include 1-bit information. When an ACK message is received after transmitting the data packet, the user device 201 may transmit a next data packet, and when a NACK message is received or a response message is not received within a specified time, the user device 201 may retransmit the same data packet.

Although the second device 202-2 may transmit a response message to the first device 202-1 through the second link 215, because the first device 202-1 must use some of the allocated resources to receive the data packet from the user device 201, the resources may be wasted. When some of the resources of the first device 202-1 are used, even the user device 201 may not receive a response message or a delay may occur, and thus performance degradation and power consumption of data packet transmission may increase. In addition, as the number of devices (e.g., 202-2) that do not create a link with the user device 201 increases, the time required for the first device 202-1 to determine whether another device (e.g., 202-2) receives a data packet may be increased.

According to various embodiments, the second device 202-2 may use the information related to the first link 205 to transmit a response message to the user device 201 without using the first device 202-1. For example, the second device 202-2 may generate an access code (or a channel access code) and address information (e.g., LT address information) corresponding to the first link 205 based on the information related to the first link 205, and may transmit a response message including the generated access code and address information to the user device 201.

The first and second devices 202-1 and 202-2 may negotiate timing for transmitting a response message to allow the second device 202-2 to transmit the response message to the user device 201 without using the first device 202-1. The first and second devices 202-1 and 202-2 may determine a first timing and a second timing for transmitting a response message. In the disclosure, the timing at which the response message is first transmitted may be referred to as the first timing, and the timing after the first timing may be referred to as the second timing.

According to an embodiment, the first and second devices 202-1 and 202-2 may determine a device using the first timing through a timing negotiation procedure. For example, the first and second devices 202-1 and 202-2 may determine that the second device 202-2 transmits a response message at the first timing, and the first device 202-1 transmits a response message at the second timing. According to another embodiment, the first and second devices 202-1 and 202-2 may determine the type of a response message transmitted at the first timing through a timing negotiation procedure. For example, the first and second devices 202-1 and 202-2 may determine that a message indicating NACK is transmitted at the first timing and a message indicating ACK at the second timing. Specific embodiments of the timing negotiation procedure will be described later with reference to FIGS. 5A to 5C and 6A to 6D.

Through the above-described method, not only the first device 202-1 but also the second device 202-2 transmits a response message to the user device 201, thereby preventing performance degradation and power consumption of data packet transmission.

Figure 3:
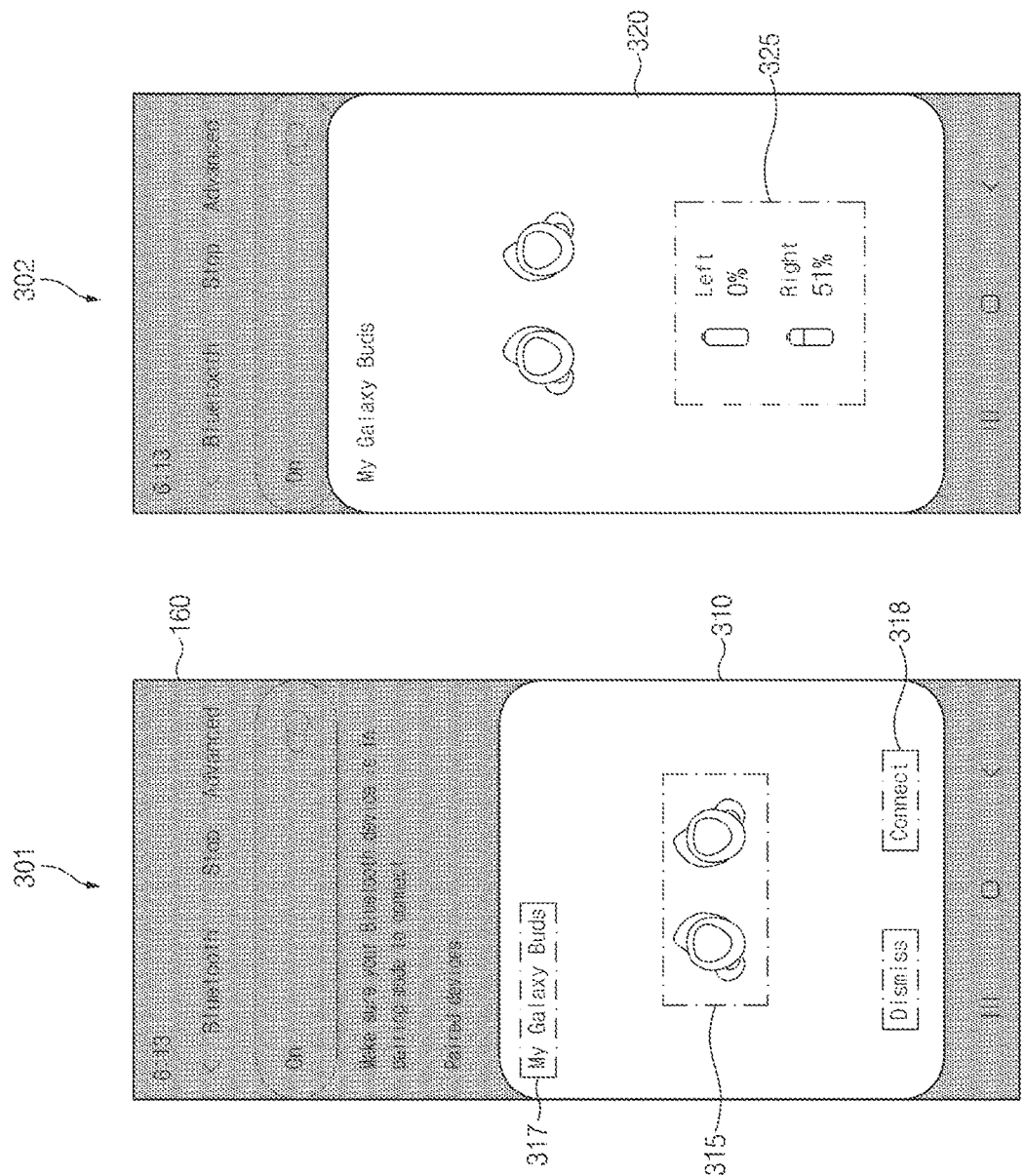
FIG. 3 is a view illustrating a user interface (UI) representing a connection of devices in a Bluetooth network environment according to an embodiment of the disclosure.

FIG. 3 is a view illustrating a user interface (UI) representing a connection of devices in a Bluetooth network environment according to an embodiment of the disclosure. FIG. 3 illustrates an embodiment in which the first and second devices 202-1 and 202-2 are configured as a set, but the same principle may be applied to a user interface representing only the connection between the user device 201 and the first device 202-1.

Referring to FIG. 3, as in reference numeral 301, the user device 201 may recognize the first device 202-1 by receiving an advertising signal transmitted from the first device 202-1, and may output a first user interface 310 for informing a user of the recognized first device 202-1 and the second device 202-2 constituting a set with the first device 202-1 through the display device 160 (e.g., a display).

For example, the first user interface 310 may include at least one of an image 315 representing the shapes of the first and second devices 202-1 and 202-2 or a text 317 indicating the device name (e.g., My Galaxy Buds) of the first and second devices 202-1 and 202-2. As another example, although not shown in FIG. 3, the first user interface 310 may indicate whether the first device 202-1 or the second device 202-2 has a history of previous connections.

According to an embodiment, the advertising signal may include information for connection (or pairing) between the user device 201 and the first device 202-1. For example, the advertising signal may include at least one of identification information of the first device 202-1, user account information, current pairing information indicating whether the first device 202-1 is being paired with another device, a pairing list representing a list of previously paired devices with the first device 202-1, simultaneous pairing information indicating a device capable of being paired simultaneously with the first device 202-1, transmission power, a sensing area, or battery state information. As another example, when the first device 202-1 forms a set with the second device 202-2, the advertising signal may include at least one of identification information of the second device 202-2, user account information, current pairing information indicating whether the second device 202-2 is being paired with another device, a pairing list representing a list of previously paired devices with the second device 202-2, simultaneous pairing information indicating a device capable of being paired simultaneously with the first device 202-1, transmission power, a sensing area, or battery state information.

According to an embodiment, the first device 202-1 may transmit an advertising signal through a multicasting scheme or a broadcasting scheme.

According to an embodiment, the first device 202-1 may transmit an advertising signal under a specified condition. For example, the first device 202-1 may transmit an advertising signal in response to detecting that a case in which the first device 202-1 is kept is opened. As another example, the first device 202-1 may transmit the advertising signal in response to receiving power or a user input. As another example, the first device 202-1 may transmit the advertising signal by specified periods.

According to an embodiment, the user device 201 may establish the first link 205 with the first device 202-1 in response to receiving a user input 318 requesting a connection with the first device 202-1, or automatically without any user inputs. According to an embodiment, the user device 201 and the first device 202-1 may establish the first link 205 of FIG. 2 in a procedure based on the Bluetooth standard. For example, the user device 201 and the first device 202-1 may perform a baseband page procedure for recognizing a counterpart device, an LN/IP procedure for identifying a link manager protocol (LMP) version, a clock offset, and a supporting function (e.g., supported features), a host request/response procedure for identifying a connection, an authentication procedure for identifying whether the counterpart device is a trustable device, an encryption procedure, and a setup complete procedure for notifying the host of completion of a connection (e.g., the first link 205).

When the first link 205 is established, as in reference numeral 302, the user device 201 may output a second user interface 320 indicating that the first device 202-1 is connected to the user device 201 through the display device 160. For example, the second user interface 320 may further include an image 325 representing battery states of the first device 202-1 and the second device 202-2 constituting a set with the first device 202-1.

Although not shown in FIG. 3, according to an embodiment, when the first device 202-1 is discovered in a state where the user device 201 is already connected to an external device other than the first and second devices 202-1 and 202-2, the user device 201 may transmit information about a link already connected to the first device 202-1 such that the first or second device 202-1 or 202-2 monitors the already connected link between the user device 201 and the external device. In this case, the first user interface 310 may include information indicating that the first or second device 202-1 or 202-2 may be added. When a user input requesting the addition of the first or second device 202-1 or 202-2 is received, the user device 201 may transmit information about the already connected link to the first device 202-1.

Figure 4:
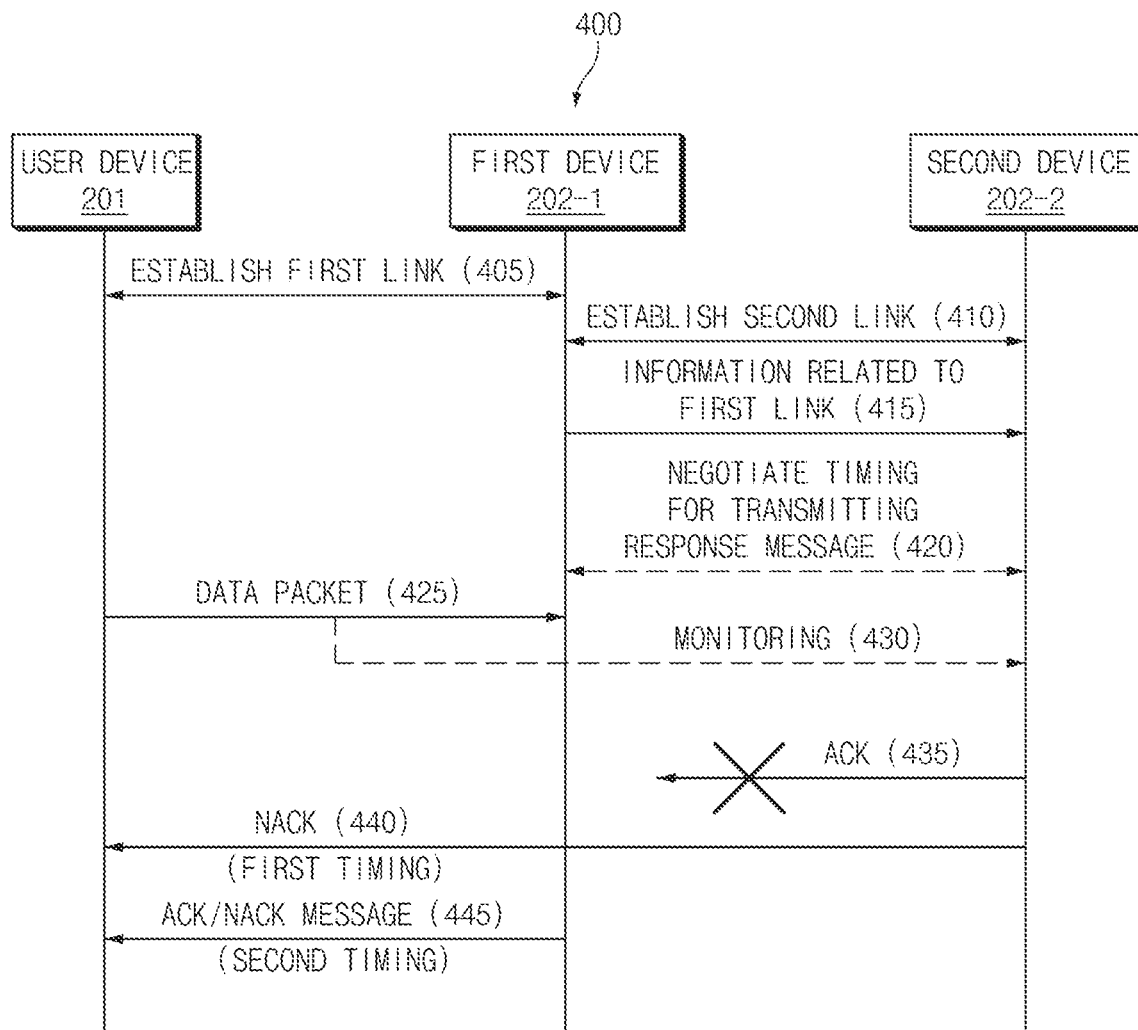
FIG. 4 is a signaling chart illustrating transmission of a response message according to an embodiment of the disclosure.

FIG. 4 is a signaling chart illustrating transmission of a response message according to an embodiment of the disclosure.

Referring to FIG. 4, in a signaling chart 400, in operation 405, the user device 201 may establish a first link (e.g., the first link 205 of FIG. 1) with the first device 202-1.

In operation 410, the first device 202-1 may establish a second link (e.g., the second link 215 of FIG. 2) with the second device 202-2. According to an embodiment, the first and second devices 202-1 and 202-2 may establish the second link 215 before the first device 202-1 establishes the first link 205 with the user device 201.

In operation 415, the first device 202-1 may transmit information related to the first link 205 to the second device 202-2. The information related to the first link 205 may include, for example, at least one of address information, clock information, channel information, SDP result information, information about supported functions, key information, or an EIR packet.

According to other embodiments, the first device 202-1 may transmit the information related to the first link 205 before the second link 215 is established or during a procedure in which the second link 215 is established. According to other embodiments, the first device 202-1 may transmit the information related to the first link 205 through an external device (e.g., the external server 203 of FIG. 2) that interoperates with the first or second device 202-1 or 202-2 with a user account (e.g., a family account) that is the same as or similar to the user account of the first or second device 202-1 or 202-2. For example, after the first link 205 is established, the first device 202-1 may transmit the information related to the first link 205 to the external server 203, and the external server 203 may transmit the information related to the first link 205 to the second device 202-2.

In operation 420, the first and second devices 202-1 and 202-2 may negotiate timing for the transmission of the response message. Although FIG. 4 illustrates an embodiment which operation 420 is performed after operation 415, according to another embodiment, the first and second devices 202-1 and 202-2 may perform operation 420 after the second link 215 is established. According to another embodiment, the first and second devices 202-1 and 202-2 may negotiate the timing through an external device (e.g., the external server 203). According to another embodiment, when the first and second devices 202-1 and 202-2 constitute one set, the first and second devices 202-1 and 202-2 may store the information related to the negotiated timing in advance. According to other embodiments, the first and second devices 202-1 and 202-2 may negotiate the timing through operation 410 or 415 without separately performing operation 420.

For example, the first and second devices 202-1 and 202-2 may negotiate the timing corresponding to the functions of the master and slave devices determined while establishing the second link 215. In this case, the first and second devices 202-1 and 202-2 may determine to allow a device (e.g., the first device 202-1) serving as the master device to use the second timing and to allow a device (e.g., the second device 202-2) serving as the slave device to use the first timing. To the contrary, the first and second devices 202-1 and 202-2 may determine to allow a device (e.g., the first device 202-1) serving as the master device to use the first timing and to allow a device (e.g., the second device 202-2) serving as the slave device to use the second timing. When the functions of the master device and the slave device are changed based on the battery status of the first and second devices 202-1 and 202-2, the first and second devices 202-1 and 202-2 may change the devices using the first timing and the second timing.

As another example, the first and second devices 202-1 and 202-2 may negotiate timing in accordance with a subject delivering information related to the first link 205. In this case, the first and second devices 202-1 and 202-2 may determine to allow a device (e.g., the first device 202-1) transmitting the information related to the first link 205 to use the first timing and to allow a device (e.g., the second device 202-2) receiving the information related to the first link 205 to use the second timing. To the contrary, the first and second devices 202-1 and 202-2 may determine to allow a device (e.g., the first device 202-1) transmitting the information related to the first link 205 to use the second timing and to allow a device (e.g., the second device 202-2) receiving the information related to the first link 205 to use the first timing.

In operation 425, the user device 201 may transmit a data packet including contents to the first device 202-1 through the first link 205.

In operation 430, the second device 202-2 may monitor the first link 205 based on at least a piece (e.g., address information or clock information) of the information related to the first link 205. The second device 202-2 may receive the same data packet as the data packet received by the first device 202-1 through monitoring. The operation 430 may be referred to as shadowing or snooping.

According to an embodiment, the first and second devices 202-1 and 202-2 may transmit a response message to the user device 201 in response to the data packet received from the user device 201. The first device 202-1 may transmit a response message to the user device 201 through the first link 205. For example, the first device 202-1 may transmit the response message including an access code and address information (e.g., LT address information) corresponding to the first link 205 to the user device 201.

The second device 202-2 may transmit the response message to the user device 201 based on the information related to the first link 205 received in operation 420. For example, the second device 202-2 may transmit, to the user device 201, the response message that includes an access code corresponding to the first link 205.

According to an embodiment, the first and second devices 202-1 and 202-2 may transmit the response message at the negotiated timing through a timing negotiation procedure. For example, the first device 202-1 may transmit the response message at the second timing, and the second device 202-2 may transmit the response message at the first timing corresponding to a timing earlier than the second timing.

Because the user device 201 establishes a single link (e.g., the first link 205) with a single device (e.g., the first device 202-1), the user device 201 may determine whether the data packet is to be retransmitted based on the type of the response message first received without considering all the response messages respectively transmitted from the first and second devices 202-1 and 202-2. In this case, even if the first device 202-1 transmits a response message indicating NACK at the second timing, the user device 201 may transmit a next data packet in response to a response message indicating ACK transmitted from the second device 202-2 at the first timing and the first device 202-1 may lose the opportunity to receive the same data packet again.

In order to guarantee an opportunity for the first device 202-1 to receive the same data packet again, the second device 202-2 may not transmit a response message indicating ACK in operation 435 even though the second device 202-2 normally receives the data packet. When the data packet is not normally received, in operation 440, the second device 202-2 may transmit a response message indicating NACK to the user device 201 at the first timing in order to request retransmission of the same data packet. In operation 445, the first device 202-1 may transmit a response message to the user device 201 at the second timing regardless of the type (e.g., ACK or NACK) of a response message. According to an embodiment, the user device 201 may retransmit the same data packet or transmit a next data packet in response to receiving a response message indicating NACK transmitted at the first timing or receiving a response message indicating ACK or NACK transmitted at the second timing.

Although not shown in FIG. 4, in response to receiving the response message indicating NACK, the user device 201 may directly retransmit the same data packet, or the first device 202-1 may relay the data packet. In this case, the user device 201 may request the first device 202-1 to relay the data packet.

FIG. 4 illustrates an embodiment in which the first device 202-1 transmits a response message indicating ACK or NACK at a second timing, and the second device 202-2 transmits a response message indicating NACK at a first timing, but, according to other embodiments, the first and second devices 202-1 and 202-2 may transmit a response message at a changed timing. For example, the first device 202-1 may transmit a response message indicating NACK at the first timing, and the second device 202-2 may transmit a response message indicating ACK or NACK at the second timing.

FIGS. 5A to 5C and 6A to 6D are views illustrating examples of an operation of transmitting a response message at a specified timing according to various embodiments of the disclosure.

Figure 5A:
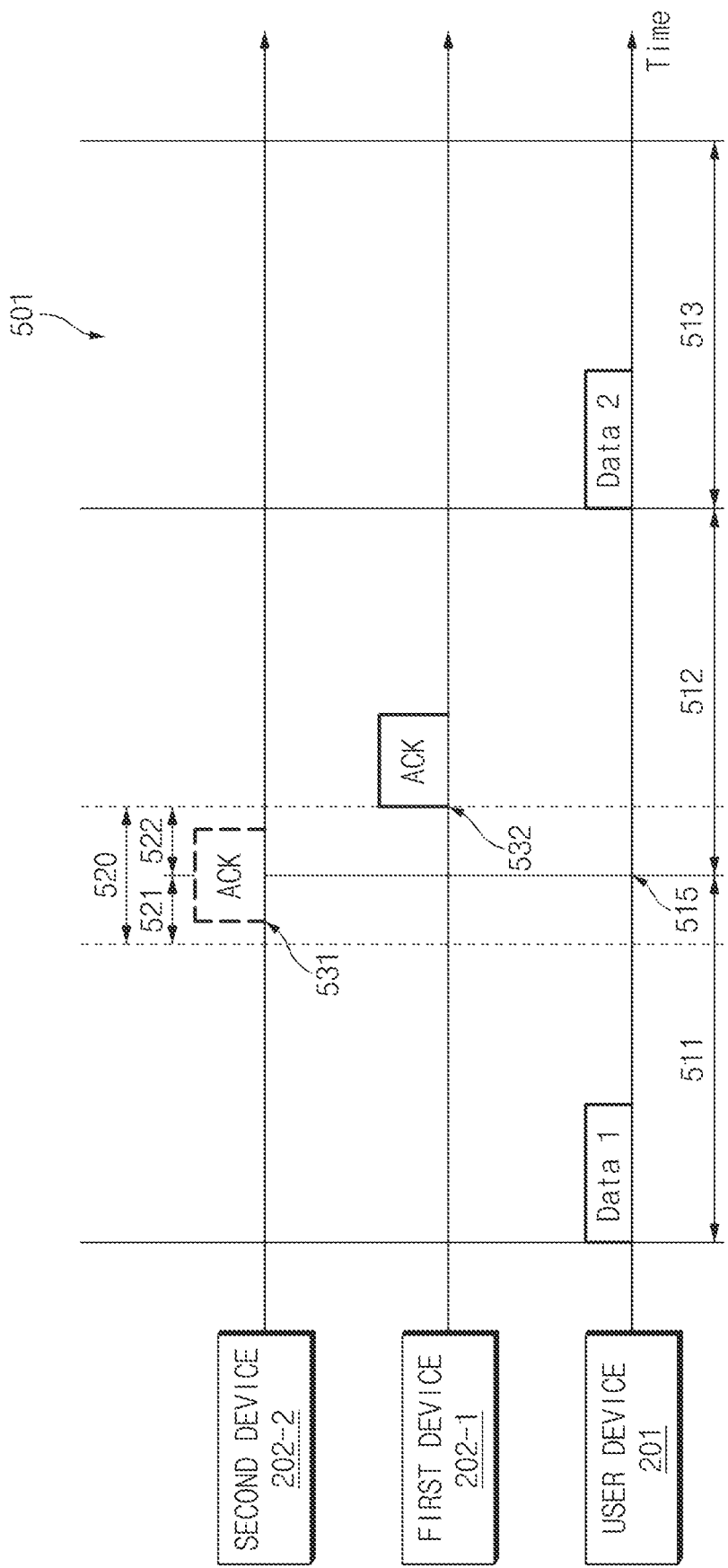
FIG. 5A is a view illustrating one example of an operation of transmitting a response message at a specified timing according to an embodiment of the disclosure.
Figure 5B:
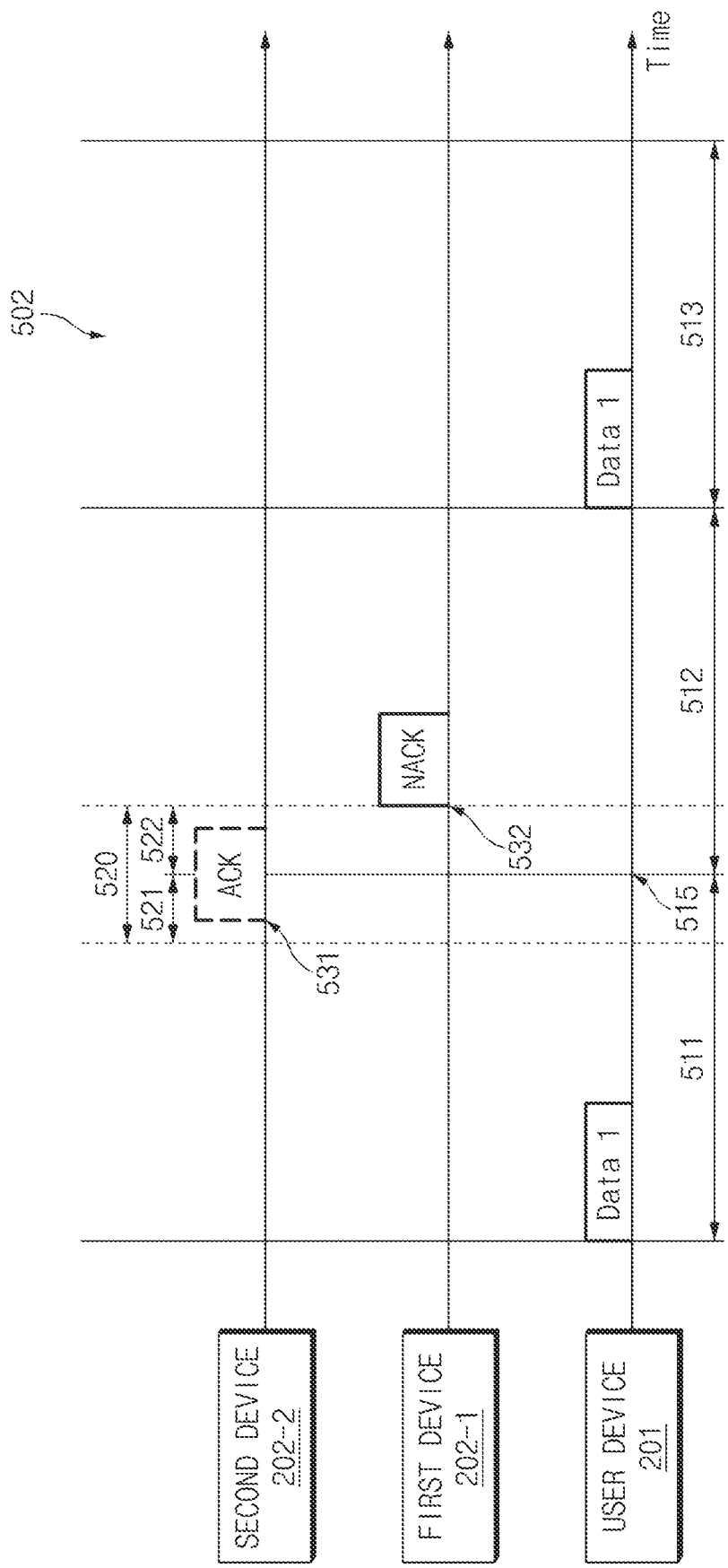
FIG. 5B is a view illustrating another example of an operation of transmitting a response message at a specified timing according to an embodiment of the disclosure.
Figure 5C:
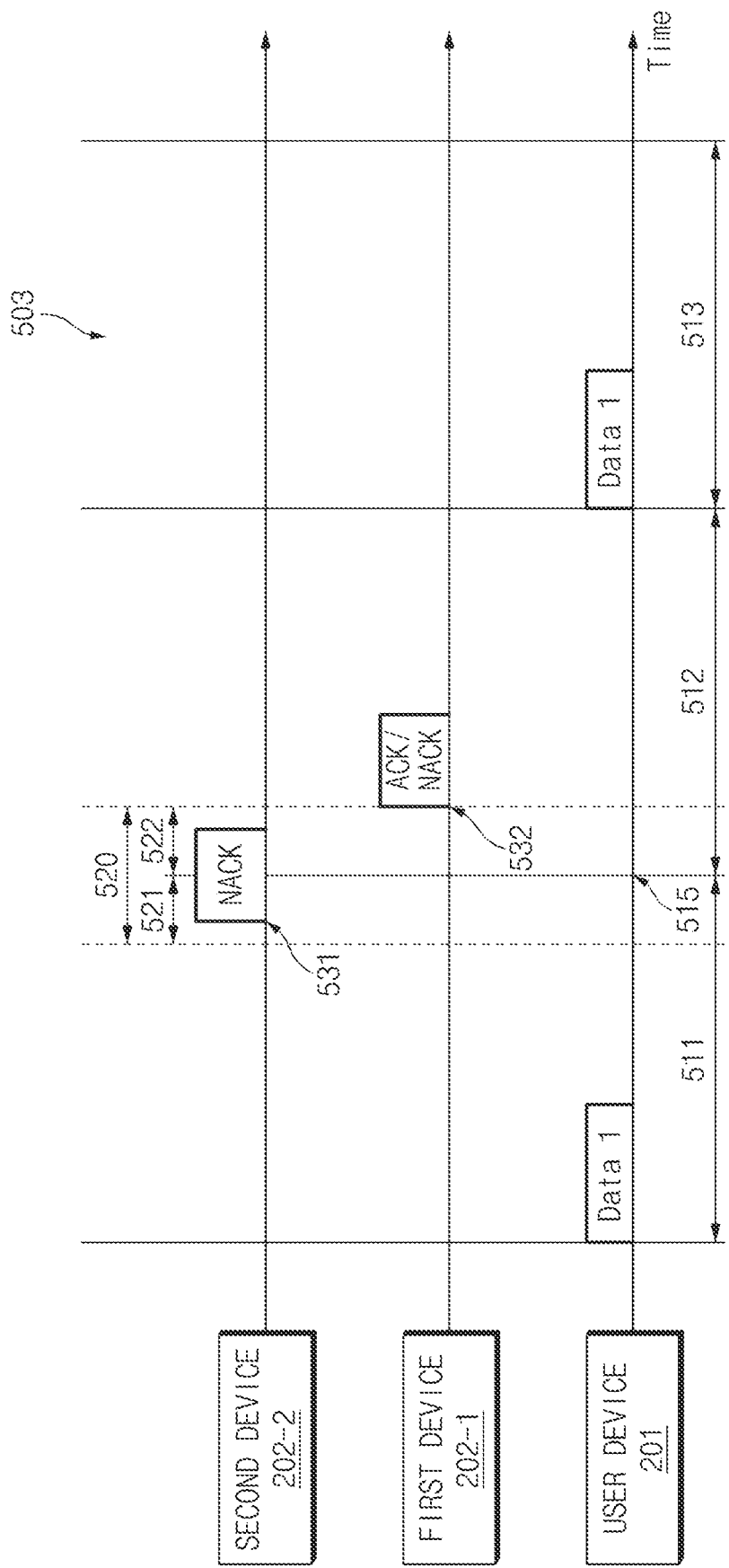
FIG. 5C is a view illustrating another example of an operation of transmitting a response message at a specified timing according to an embodiment of the disclosure.

FIGS. 5A to 5C illustrate an embodiment of negotiating timing for transmission of a response message corresponding to a subject transmitting the response message. For example, the first and second devices 202-1 and 202-2 may depend on the functions of the master and slave devices, or may negotiate the timing for the transmission of the response message depending on a subject transmitting the information related to the first link 205. FIGS. 5A to 5C illustrate an embodiment in which the second device 202-2 uses the first timing and the first device 202-1 uses the second timing, but according to other embodiments, the second device 202-2 may use the second timing and the first device 202-1 may use the first timing.

Referring to FIGS. 5A to 5C, the horizontal axes of the graphs 501, 502, and 503 may represent time. The user device 201 may transmit a first data packet in a first transmission slot (Tx slot) 511 and in a first reception slot (Rx slot) 512 or in a time margin section 520, may receive a response message. For example, the time margin section 520 may be referred to as an Rx cycle defined by the Bluetooth standard. The user device 201 may retransmit the first data packet in the second transmission slot 513 or transmit the second data packet corresponding to the data packet following the first data packet in the second transmission slot 513 based on the received response message.

In the Bluetooth network environment, because the user device 201 or the devices 202-1 and 202-2 perform the transmission or reception of the data packet based on the clock, when the data packet is not transmitted or received at the specified timing, the communication performance may be degraded. In order to ensure the stability of the transmission or reception of the data packet, the user device 201 may set the time margin section 520 based on a boundary 515 between the reception slot 512 for receiving the response message and the previous slot (e.g., the transmission slot 511) of the reception slot 512. For example, the time margin section 520 may include a time section 521 before a specified time (e.g., about 10 μs) from the boundary 515 and a time section 522 after a specified time (e.g., about 10 μs) from the boundary 515.

According to various embodiments, the first and second timings for transmitting the response message may be determined based on the time margin section 520. For example, the first timing (e.g., 531) may be included in the time margin section 520, and the second timing (e.g., 532) may be included in the time section after the time margin section 520. As another example, although not shown in FIGS. 5A to 5C, the first and second timings may be included in the time margin section 520. In this case, the first timing may be included in the time section 521 before the specified time from the boundary 515, and the second timing may be included in the time section 522 after the specified time from the boundary 515.

FIG. 5A illustrates an example in which the first and second devices 202-1 and 202-2 normally receive the first data packet. The first device 202-1 may transmit a response message indicating ACK at the second timing (e.g., 532). The second device 202-2 may not transmit the response message indicating ACK. As another example, the second device 202-2 may adjust the transmission power for transmitting the response message to a threshold value or less to prevent the user device 201 from receiving a response message. For example, the threshold value may be determined or preset based on a distance between the second device 202-2 and the user device 201. The user device 201 may transmit a second data packet in the second transmission slot 513 in response to a message indicating ACK transmitted at the second timing.

FIG. 5B illustrates an example in which the second device 202-2 normally receives the first data packet and the first device 202-1 does not normally receive the first data packet. The first device 202-1 may transmit a response message indicating NACK at the second timing (e.g., 532). Even though the second device 202-2 normally receives the first data packet, the second device 202-2 may not transmit a response message indicating ACK to guarantee the opportunity for the first device 202-1 to receive the first data packet again. As another example, the second device 202-2 may adjust the transmission power for transmitting a response message to the threshold value or less to prevent the user device 201 from receiving the response message from the second device 202-2. The user device 201 may retransmit the first data packet in the second transmission slot 513 in response to a response message indicating NACK transmitted at the second timing. In this case, the second device 202-2 that normally receives the first data packet may ignore the retransmitted first data packet.

FIG. 5C illustrates an example in which the second device 202-2 does not normally receive the first data packet. The second device 202-2 may transmit a response message indicating NACK at the first timing (e.g., 531). Because the first timing is earlier than the second timing (e.g., 532), the user device 201 may retransmit the first data packet in the second transmission slot 513 in response to the response message transmitted from the second device 202-2 regardless of the response message transmitted from the first device 202-1. In this case, when the first device 202-1 normally receives the first data packet in the first transmission slot 511, the first device 202-1 may ignore the first data packet retransmitted in the second transmission slot 513.

FIGS. 6A to 6D illustrate an embodiment of negotiating timing for transmission of a response message corresponding to a type of the response message. For example, the first and second devices 202-1 and 202-2 may negotiate timing to transmit NACK at the first timing and to transmit ACK at the second timing.

Referring to FIGS. 6A to 6D, the horizontal axes in the graphs 601, 602, 603, 604 may represent time. Of the components illustrated in FIGS. 6A to 6D, the components having the same reference numerals as the components illustrated in FIGS. 5A to 5C may perform the same functions.

Figure 6A:
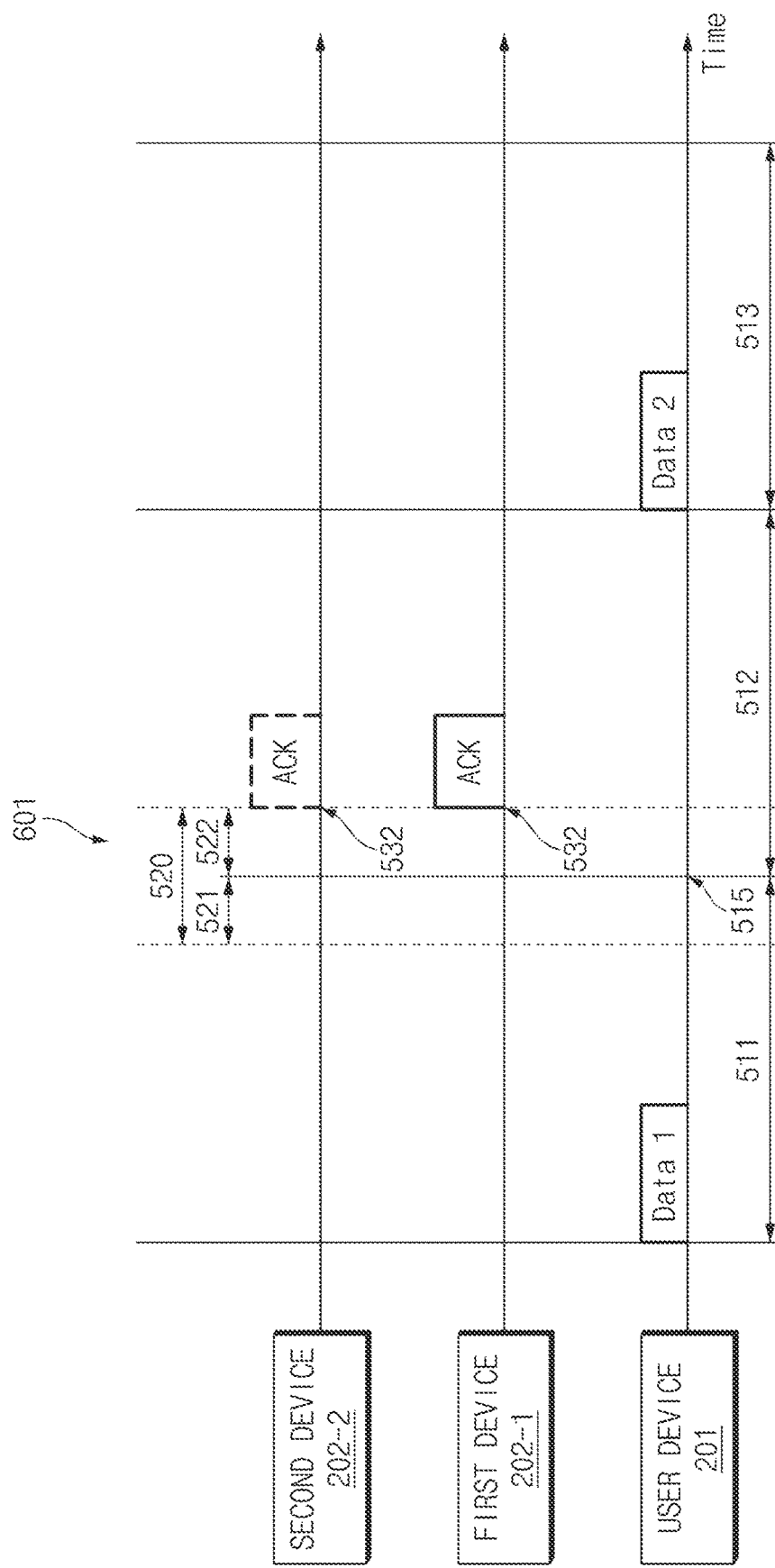
FIG. 6A is a view illustrating another example of an operation of transmitting a response message at a specified timing according to an embodiment of the disclosure.

Referring to FIG. 6A, an example in which the first and second devices 202-1 and 202-2 normally receive a first data packet is illustrated. The first and second devices 202-1 and 202-2 may transmit the response message indicating ACK at the second timing (e.g., 532). According to another embodiment, the second device 202-2 may not transmit the response message indicating ACK or adjust the transmission power for transmitting the response message to the threshold value or less. The user device 201 may transmit the second data packet in the second transmission slot 513 in response to the response message indicating ACK. According to an embodiment, when the second device 202-2 transmits the response message, the user device 201 may process the response message first received and then ignore the response message subsequently received.

Referring to FIG. 6B, an example in which the second device 202-2 normally receives the first data packet and the first device 202-1 does not normally receive the first data packet is illustrated. The first device 202-1 may transmit the response message indicating NACK at the first timing (e.g., 531), and the second device 202-2 may transmit the response message indicating ACK at the second timing (e.g., 532). In this case, the user device 201 may process the first received response message (e.g., the response message indicating NACK) and may ignore the subsequently received response message (e.g., the response message indicating ACK). According to another embodiment, the second device 202-2 may not transmit the response message indicating ACK or may adjust the transmission power for transmitting the response message to the threshold value or less. The user device 201 may retransmit the first data packet in the second transmission slot 513 in response to the response message indicating NACK.

Figure 6C:
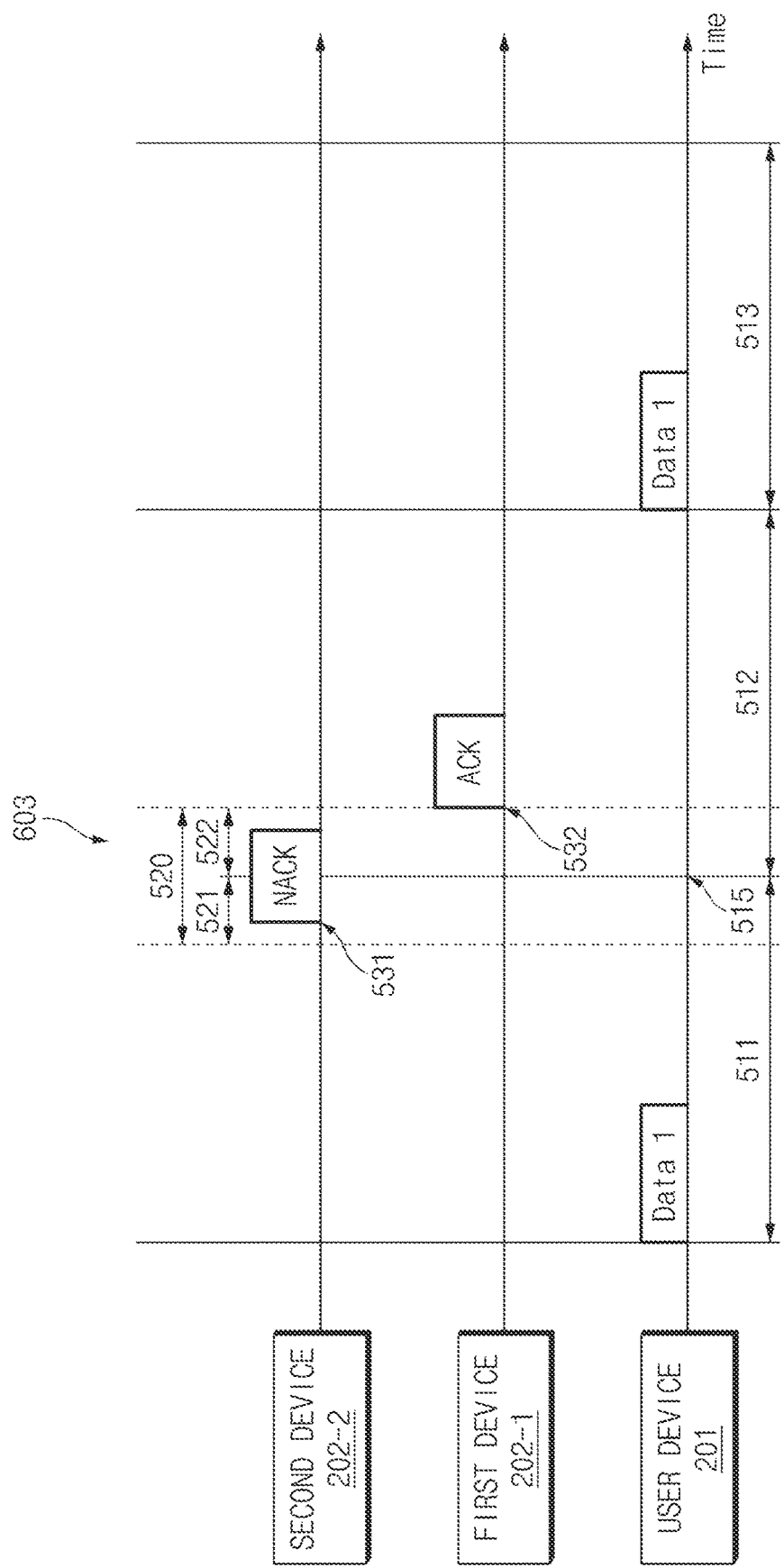
FIG. 6C is a view illustrating another example of an operation of transmitting a response message at a specified timing according to an embodiment of the disclosure.

Referring to FIG. 6C, an example in which the first device 202-1 normally receives the first data packet and the second device 202-2 does not normally receive the first data packet is illustrated. The second device 202-2 may transmit the response message indicating NACK at the first timing (e.g., 531), and the first device 202-1 may transmit the response message indicating ACK at the second timing (e.g., 532). Because the user device 201 receives the response message indicating NACK before the response message indicating ACK, the user device 201 may retransmit the first data packet in the second transmission slot 513 in response to the response message indicating NACK. In this case, the user device 201 may ignore the response message indicating ACK received from the first device 202-1.

Figure 6D:
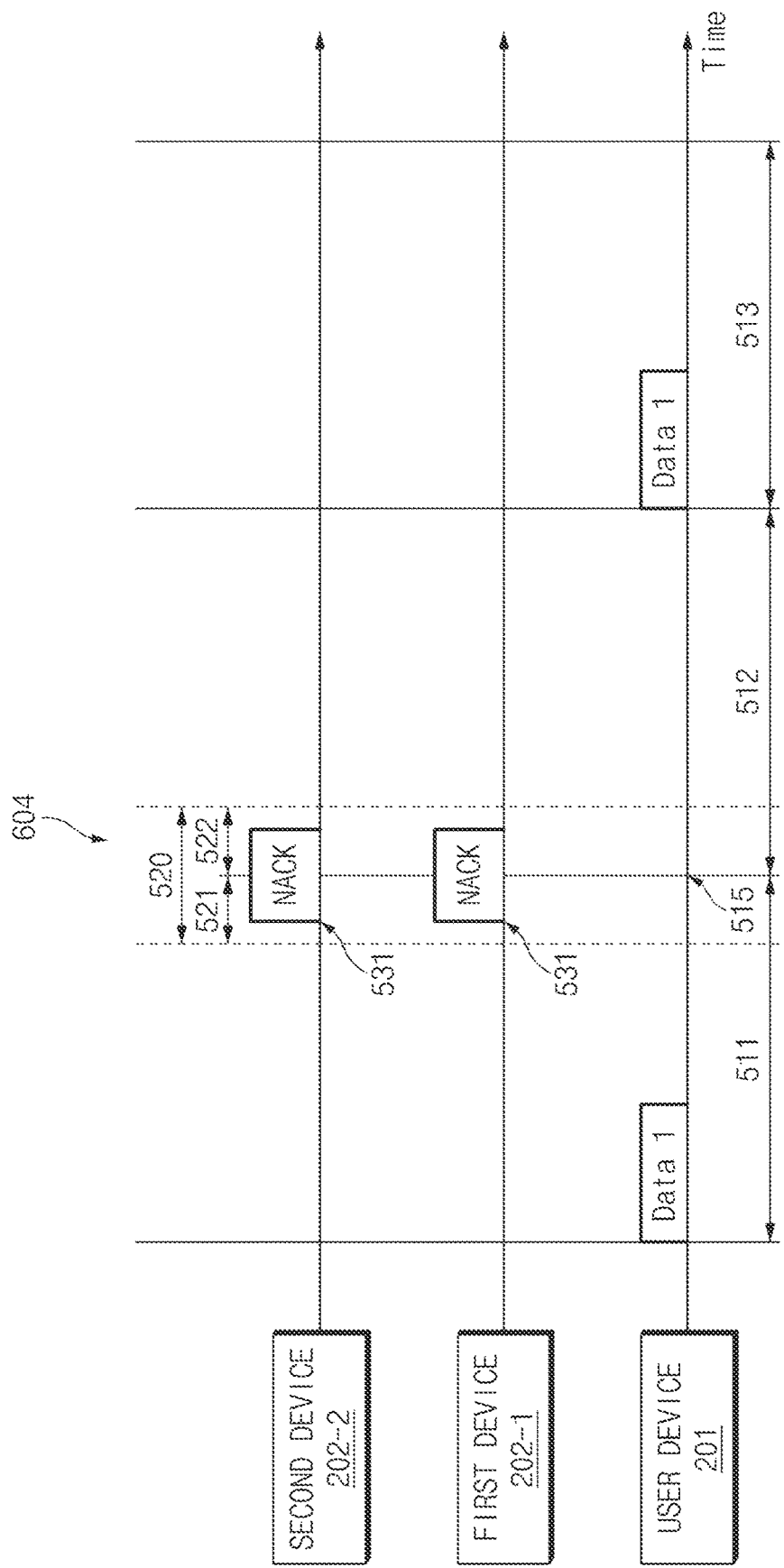
FIG. 6D is a view illustrating another example of an operation of transmitting a response message at a specified timing according to an embodiment of the disclosure.

Referring to FIG. 6D, an example in which the first and second devices 202-1 and 202-2 do not normally receive the first data packet is illustrated. The first and second devices 202-1 and 202-2 may transmit the response message indicating NACK at the first timing (e.g., 531). When a plurality of response messages indicating NACK are transmitted at the same timing, the user device 201 may receive one of the plurality of response messages, or because the user device 201 does not receive the response message indicating ACK although all of the plurality of response messages are not normally received, the user device 201 may retransmit the first data packet in the second transmission slot 513.

Figure 7:
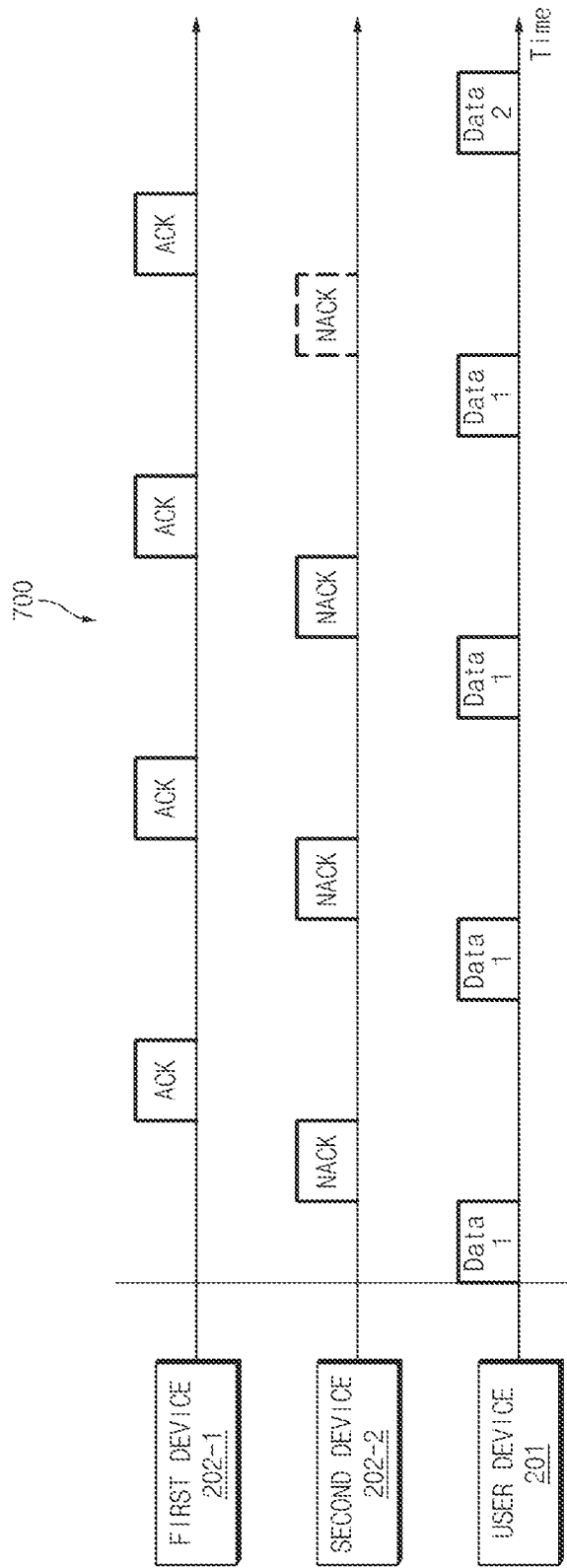
FIG. 7 is a view illustrating an example of an operation of restricting transmission of a response message according to an embodiment of the disclosure.

FIG. 7 is a view illustrating an example of an operation of restricting transmission of a response message according to an embodiment of the disclosure. FIG. 7 illustrates an example in which the second device 202-2 transmits the response message at the first timing, and the first device 202-1 transmits the response message at the second timing.

Referring to FIG. 7, the horizontal axis in a graph 700 may represent time. For reasons such as the presence of physical obstructions, distance constraints, or deterioration of the electric field situation, even though the user device 201 transmits the first data packet a plurality of times, the second device 202-2 may not normally receive the first data packet. The second device 202-2 may transmit the response message indicating NACK a plurality of times. FIG. 7 illustrates an embodiment in which the second device 202-2 does not normally receive the first data packet, but the same principle may be applied to the first device 202-1.

As the number of times that the user device 201 retransmits the first data packet increases, an interval between a time point at which the first data packet is received and a time point at which the second data packet is received at the first device 202-1 is increased, so that a disconnection phenomenon may occur in terms of users. In order to prevent the disconnection phenomenon, the second device 202-2 may limit the number of times (or time) of transmitting the response message indicating NACK for the same data packet (e.g., the first data packet). For example, even if the first data packet is not normally received after the second device 202-2 transmits the response message indicating NACK for the first data packet three times, the second device 202-2 may not transmit the response message indicating NACK. As another example, the second device 202-2 starts to operate a timer when first transmitting the response message indicating NACK, and when the timer expires, the second device 202-2 may not transmit the response message indicating NACK even if the first data packet is not normally received. The user device 201 may transmit the second data packet in response to the response message indicating ACK received from the first device 202-1.

According to another embodiment, although not shown in FIG. 7, the user device 201 may limit the number of times of transmissions for the same data packet (e.g., the first data packet) or may activate the timer at a time point when the first data packet is first transmitted. When the number of transmissions exceeds the threshold or the timer expires, the user device 201 may transmit the second data packet even if it receives a response message indicating the NACK.

According to one embodiment, the number of times of transmission or the value of the timer may be changed when the user wearing the first device 202-1 and the user wearing the second device 202-2 are different. For example, when different users wear the first device 202-1 and the second device 202-2, the second device 202-2 can reduce the number of transmissions or the timer value.

Figure 8:
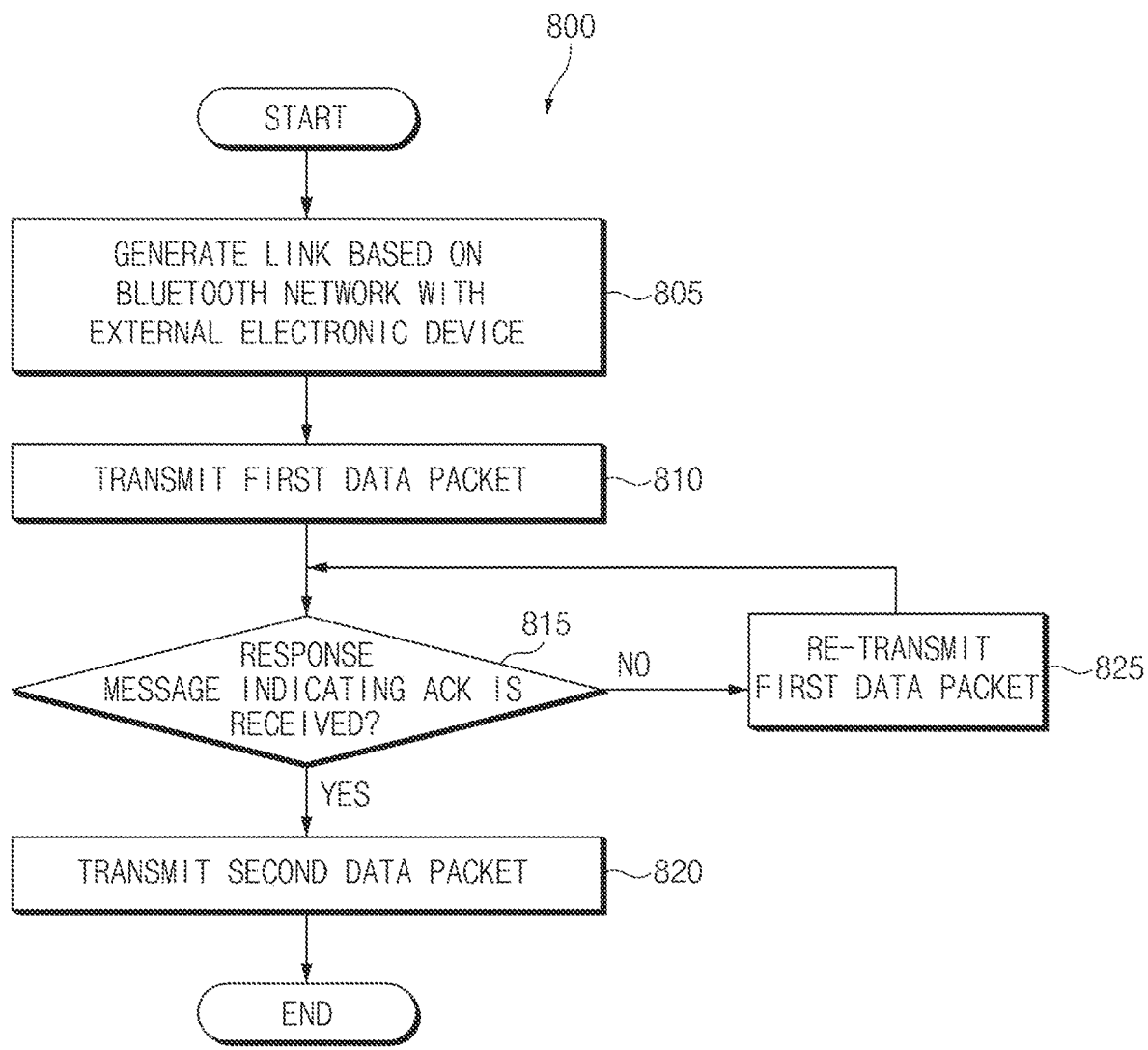
FIG. 8 is a flowchart illustrating an operation of an electronic device that receives a response message according to an embodiment of the disclosure.

FIG. 8 is a flowchart illustrating an operation of an electronic device that receives a response message according to an embodiment of the disclosure. The embodiments illustrated in FIG. 8 may be performed by the user device 201 of FIG. 2. The user device 201 may perform operations corresponding to the flowchart through at least one component (e.g., the processor 120 of FIG. 1, or the wireless communication module 192) included in the user device 201.

Referring to FIG. 8, in a method 800, in operation 805, an electronic device may generate a link (e.g., the first link 205 of FIG. 2) based on Bluetooth network with an external electronic device (e.g., the first device 202-1 of FIG. 2) through a processor and a wireless communication circuit.

In operation 810, the electronic device may transmit a first data packet including contents to the external electronic device through the processor and the wireless communication circuit. According to an embodiment, the electronic device may transmit the first data packet to the external electronic device through the link generated in operation 805.

In operation 815, the electronic device may determine whether a response message indicating ACK is received. When a plurality of response messages are received from a plurality of external electronic devices (e.g., the first device 202-1 and the second device 202-2 of FIG. 2), the electronic device may process one response message. For example, the electronic device may determine whether to retransmit the first data packet based on the first received response message.

When the response message indicating ACK is received, in operation 820, the electronic device may transmit a second data packet corresponding to the subsequent data packet of the first data packet to the external electronic device.

When the response message indicating NACK is first received or the response message indicating ACK is not received, in operation 825, the electronic device may retransmit the first data packet to the external electronic device. The electronic device may repeatedly perform operations 815 and 825 until the response message indicating the ACK is received.

Although not shown in FIG. 8, when the number of times that the electronic device performs the operation 825 exceeds a threshold value or a specified time elapses from the time point when performing the operation 810, the electronic device may perform the operation 820 even though the response message indicating ACK is not received.

Figure 9:
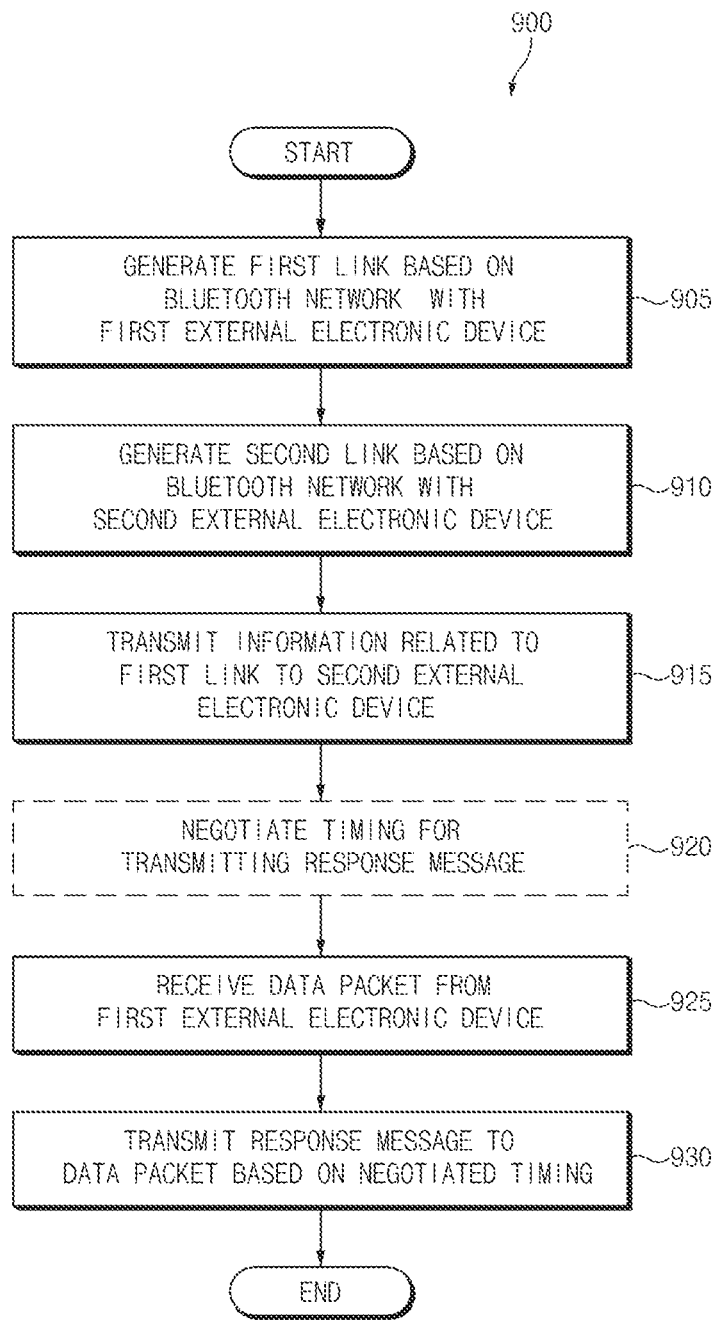
FIG. 9 is a flowchart illustrating an operation of an electronic device transmitting a response message according to an embodiment of the disclosure.

FIG. 9 is a flowchart illustrating an operation of an electronic device that transmits a response message according to an embodiment of the disclosure. The embodiments illustrated in FIG. 9 may be performed by the first device 202-1 of FIG. 2. The first device 202-1 may perform operations corresponding to the flowchart through at least one component (e.g., the processor 120 of FIG. 1, or the wireless communication module 192) included in the first device 202-1.

Referring to FIG. 9, in a method 900, in operation 905, an electronic device may generate a first link (e.g., the first link 205 of FIG. 2) based on Bluetooth network with a first external electronic device (e.g., the user device 201 of FIG. 2) through a processor and a wireless communication circuit.

In operation 910, the electronic device may generate a second link (e.g., the second link 215 of FIG. 2) based on the Bluetooth network with the second external electronic device (e.g., the second device 202-2 of FIG. 2) through the processor and the wireless communication circuit. According to an embodiment, the electronic device may generate a second link while maintaining the first link. According to other embodiments, the electronic device may generate the first link with the first external electronic device after generating the second link with the second external electronic device.

In operation 915, the electronic device may transmit information related to the first link to the second external electronic device through the processor and the wireless communication circuit. According to an embodiment, the information related to the first link may include information used by the second external electronic device to monitor the first link. For example, the information related to the first link may include at least one of address information, clock information, channel information, SDP result information, information about supported functions, key information, or an EIR packet.

In operation 920, the electronic device may negotiate timing for transmitting a response message with the second external electronic device through the processor and the wireless communication circuit. FIG. 9 illustrates an embodiment in which operation 920 is performed after operation 915, but according to another embodiment, the electronic device may perform operation 920 after generating a second link. According to another embodiment, the electronic device may negotiate timing through operation 910 or 915 without separately performing operation 920. For example, the electronic device may negotiate timing corresponding to the functions of master and slave devices determined during the generation of the second link. As another example, the electronic device may negotiate timing based on a subject transmitting information related to the first link.

In operation 925, the electronic device may receive a data packet from the first external electronic device through the processor and the wireless communication circuit. For example, the electronic device may receive a data packet through the first link.

In operation 930, the electronic device may transmit a response message to the data packet received in operation 925 to the first external electronic device based on the negotiated timing through the processor and the wireless communication circuit. For example, the electronic device may generate an access code and address information (e.g., LT address information) corresponding to the first link and transmit a response message including the generated access code and address information.

According to an embodiment, among the first timing and the second timing corresponding to a timing later than the first timing by a specified time, the electronic device may transmit a response message at the second timing. According to another embodiment, the electronic device may transmit the response message at a pre-allocated timing. The pre-allocated timing may be included in, for example, a time section after a time margin section (e.g., the time margin section 520 of FIG. 5A) defined by the Bluetooth standard. According to another embodiment, the electronic device may transmit a response message indicating ACK at the second timing or the pre-allocated timing and transmit a response message indicating NACK at the first timing or during the time margin section.

Figure 10:
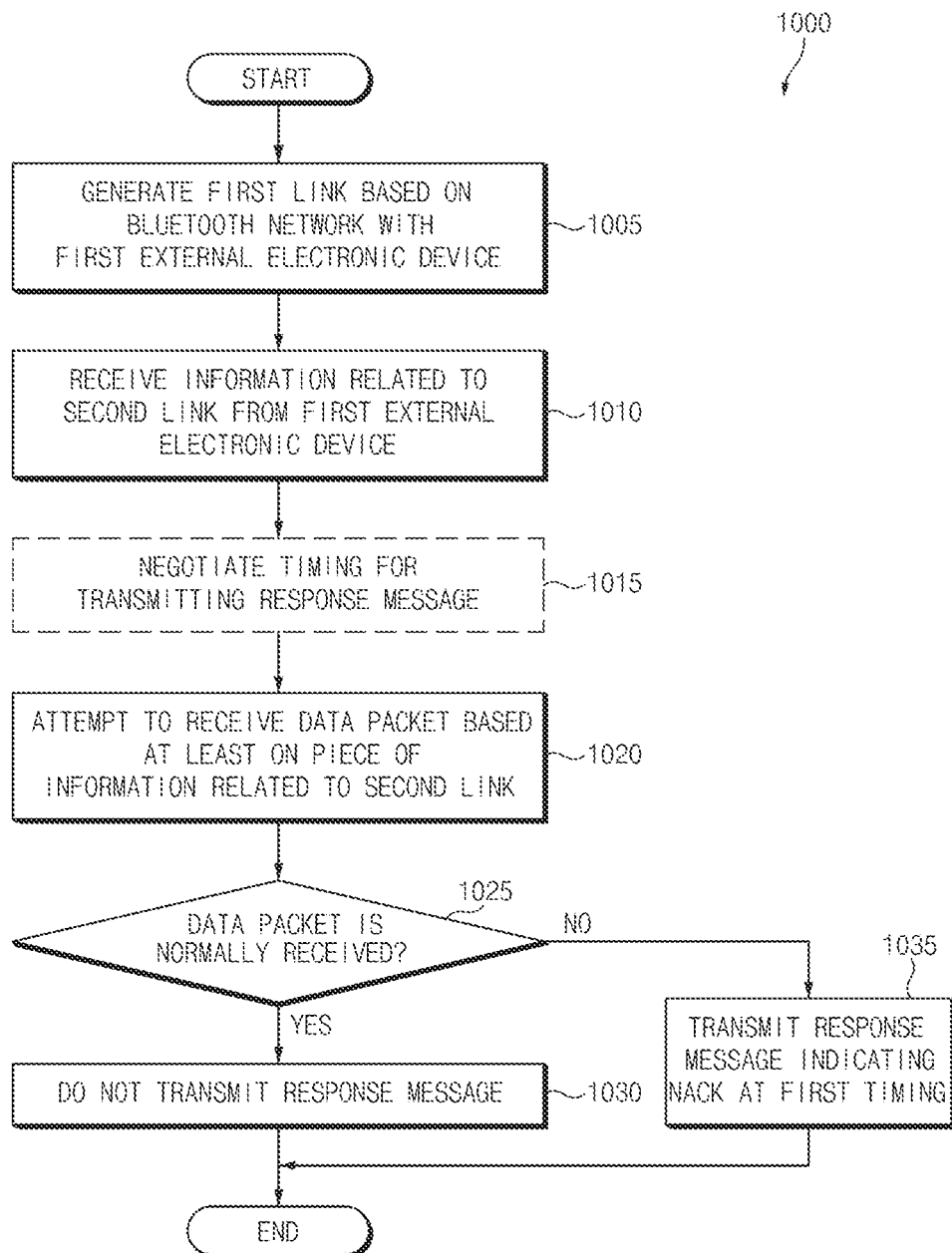
FIG. 10 is a flowchart illustrating another operation of an electronic device transmitting a response message according to an embodiment of the disclosure.

FIG. 10 is a flowchart illustrating another operation of an electronic device transmitting a response message according to an embodiment of the disclosure. The embodiments illustrated in FIG. 10 may be performed by the second device 202-2 of FIG. 2. The second device 202-2 may perform the operations of the flowchart through at least one component (e.g., the processor 120 or the wireless communication module 192 of FIG. 1) included in the second device 202-2.

Referring to FIG. 10, in a method 1000, in operation 1005, an electronic device may generate a first link (e.g., the second link 215 of FIG. 2) based on Bluetooth network with a first external electronic device (e.g., the first device 202-1 of FIG. 2) through a processor and a wireless communication circuit.

In operation 1010, the electronic device may receive information that is related to a second link (e.g., the first link 205 of FIG. 2) between the first external electronic device and a second external electronic device (e.g., the user device 201 of FIG. 2) from the first external electronic device through the processor and the wireless communication circuit. For example, the information related to the second link may include at least one of address information, clock information, channel information, SDP result information, information about supported functions, key information, or an EIR packet.

According to an embodiment, the electronic device may receive the information related to the second link from the first external electronic device before the first link is generated or while the first link is generated. According to an embodiment, the electronic device may receive the information related to the second link from the first external electronic device through an external device (e.g., the external server 203 of FIG. 2) interworking through a user account identical or similar to the electronic device. According to another embodiment, although not shown in FIG. 10, the electronic device may receive information related to the second link from the second external electronic device.

In operation 1015, the electronic device may negotiate timing for transmitting a response message with the first external electronic device through the processor and the wireless communication circuit. FIG. 10 illustrates an embodiment in which operation 1015 is performed after operation 1010, but according to another embodiment, the electronic device may perform operation 1015 after generating the first link. According to other embodiments, the electronic device may negotiate timing through operation 1005 or operation 1010 without separately performing operation 1015. For example, the electronic device may negotiate timing corresponding to the functions of master and slave devices determined during the generation of the first link. As another example, the electronic device may negotiate timing corresponding to a subject transmitting the information related to the first link. According to another embodiment, the electronic device may negotiate timing with the first external electronic device through an external device (e.g., the external server 203 of FIG. 2) interworking through a user account identical or similar to the electronic device.

In operation 1020, the electronic device may attempt to receive a data packet transmitted from the second external electronic device based on at least a piece of the information related to the second link through the processor and the wireless communication circuit. For example, the electronic device may determine a hopping channel of the second link through address information and the clock information and monitor the determined hopping channel, thereby attempting to receive a data packet transmitted from the second external electronic device.

In operation 1025, the electronic device may determine whether the data packet is normally received through the processor.

When the data packet is normally received, in operation 1030, the electronic device may not transmit a response message to provide an opportunity for the first external electronic device to receive the data packet again from the second external electronic device.

When the data packet is not normally received, in operation 1035, the electronic device may transmit a response message indicating NACK to the second external electronic device. According to an embodiment, the electronic device may generate an access code and address information (e.g., LT address information) corresponding to the second link based on the information related to the second link, and transmit a response message including the generated access code and address information to the second external electronic device. The access code and address information generated by the electronic device may be identical to the access code and address information generated by the first external electronic device.

According to an embodiment, among a first timing and a second timing corresponding to a timing later than the first timing by a specified time, the electronic device may transmit a response message indicating NACK at the first timing. For example, the electronic device may transmit the response message indicating NACK during a time margin section (e.g., the time margin section 520 of FIG. 5A) defined by the Bluetooth standard.

Although not shown in FIG. 10, when the number of times the electronic device performs operation 1035 exceeds the threshold, the electronic device may not transmit a response message indicating the NACK even if the data packet is not normally received.

As described above, an electronic device (e.g., the first device 202-1 of FIG. 2) according to an embodiment may include a wireless communication circuit (e.g., at least a portion of the wireless communication module 192 of FIG. 1) that supports a Bluetooth network, at least one processor (e.g., the processor 120 of FIG. 1) operatively connected to the wireless communication circuit, and a memory (e.g., the memory 130 of FIG. 1) operatively connected to the at least one processor, wherein the memory stores instructions that, when executed, cause the at least one processor, through the wireless communication circuit, to generate a first link (e.g., the first link 205 of FIG. 2) with a first external electronic device (e.g., the user device 201 of FIG. 2) based on the Bluetooth network, generate a second link (e.g., the second link 215 of FIG. 2) with a second external electronic device (e.g., the second device 202-2 of FIG. 2) based on the Bluetooth network, transmit information to the second external electronic device through the second link, wherein the information is used by the second external electronic device to monitor the first link, negotiate timing for transmitting a response message with the second external electronic device, receive a data packet from the first external electronic device, and transmit a response message to the first external electronic device in response to the data packet based on the negotiated timing.

According to an embodiment, the instructions, when executed, may cause the processor, through the wireless communication circuit, to transmit the response message to the first external electronic device at a second timing (e.g., the second timing 532 of FIG. 5A) among a first timing (e.g., the first timing 531 of FIG. 5A) and the second timing corresponding to a timing later than the first timing by a specified time, based on the negotiated timing.

According to an embodiment, the first timing may correspond to at least a part of a reception cycle (e.g., the time margin section of FIG. 5A) defined by the Bluetooth standard, and the second timing may correspond to at least a part of a time section after the reception cycle.

According to an embodiment, the first and second timings may correspond to at least a part of a reception cycle defined by the Bluetooth standard.

According to an embodiment, the instructions, when executed, mat cause the processor to determine a device for performing a function of a master device for the second link among the electronic device and the second external electronic device while establishing the second link, and determine that the electronic device transmits the response message at the second timing based on determining that the electronic device performs the function of the master device.

According to an embodiment, the instructions, when executed, may cause the processor to determine that the electronic device transmits the response message at the second timing based on transmitting of the information used to monitor the first link by the electronic device.

According to an embodiment, the instructions, when executed, may cause the processor, through the wireless communication circuit, to transmit the response message indicating NACK at a first timing (e.g., the first timing 531 of FIG. 5A), or transmit the response message indicating ACK at a second timing (e.g., the second timing 532 of FIG. 5A) to the first external electronic device, among the first timing and a second timing corresponding to a timing later than the first timing by a specified time based on the negotiated timing.

According to an embodiment, the instructions, when executed, may cause the processor, through the wireless communication circuit, to transmit the information used to monitor the first link to the second external electronic device through an external server (e.g., the external server 203 of FIG. 2).

As described above, a system (e.g., the topology 200 of FIG. 2) according to an embodiment may include a first electronic device (e.g., the first device 202-1 of FIG. 2) including a first wireless communication circuit (e.g., at least a part of the wireless communication module 192 of FIG. 1), and a second electronic device (e.g., the second device 202-2 of FIG. 2) including a second wireless communication circuit (e.g., the wireless communication module 192 of FIG. 1), wherein the first wireless communication circuit may establish a wireless communication link (e.g., the first link 205 of FIG. 2) with a source device (e.g., the user device 201 of FIG. 2), receive at least one packet data unit (PDU) from the source device, and transmit a first acknowledgement (ACK) signal including a channel access code to the source device after receiving the at least one PDU, and wherein the second wireless communication circuit may receive the at least one PDU from the source device while the first wireless communication circuit receives the at least one PDU in a state that the wireless communication link with the source device is not established, and start to transmit a first negative ACK (NACK) signal including the channel access code before the first wireless communication circuit starts to transmit the first ACK signal when the first wireless communication circuit fails to receive the at least one PDU from the source device.

According to an embodiment, the second wireless communication circuit may start to transmit the first NACK signal such that a part of the first ACK signal overlaps the first NACK signal.

According to an embodiment, the part of the first ACK signal may include the channel access code.

According to an embodiment, the second wireless communication circuit may start to transmit the first NACK signal after the transmission of the at least one PDU from the source device is terminated.

According to an embodiment, the first electronic device may include a first audio circuit (e.g., at least a part of the audio module 170 or the audio output device 155 of FIG. 1), and the second electronic device may include a second audio circuit (e.g., at least a part of the audio module 170 or the audio output device 155 of FIG. 1).

According to an embodiment, the at least one PDU may include audio data.

According to an embodiment, the first and second wireless communication circuits may support a Bluetooth protocol.

As described above, an electronic device (e.g., the second device 202-2 of FIG. 2) according to an embodiment may include a wireless communication circuit (e.g., the wireless communication module 192 of FIG. 1) that supports a Bluetooth network, at least one processor (e.g., the processor 120 of FIG. 1), and a memory (e.g., the memory 130 of FIG. 1) operatively connected to the at least one processor, wherein the memory stores instructions that, when executed, cause the at least one processor, through the wireless communication circuit, to generate a first link (e.g., the second link 215 of FIG. 2) with a first external electronic device based on the Bluetooth network, receive information related to a second link (e.g., the first link 205 of FIG. 2) generated between the first external electronic device and a second external electronic device (e.g., the user device 201 of FIG. 2) from the first external electronic device, negotiate timing for transmitting a response message with the first external electronic device, attempt to receive a data packet transmitted from the second external electronic device by monitoring the second link based on at least a piece of the information related to the second link, not transmit a response message when the data packet is normally received, and transmit a response message indicating a negative acknowledgement (NACK) to the second external electronic device at a first timing (e.g., the first timing 531 of FIG. 5A) among the first timing and a second timing (e.g., the second timing 532 of FIG. 5A) corresponding to a timing later than the first timing by a specified time based on the negotiated timing when the data packet is not normally received.

According to an embodiment, the information related to the second link may include at least one of address information, clock information or key information related to the second link, and wherein the instructions, when executed, may cause the processor to determine a hopping channel of the second link based on the address information and the clock information, attempt to receive the data packet by monitoring the determined hopping channel through the wireless communication circuit, generate an access code corresponding to the second link based on the address information, and transmit the response message indicating the NACK including the access code to the second external electronic device.

According to an embodiment, the first timing may be included in at least a part of a reception cycle (e.g., the time margin section 520 of FIG. 5A) defined by the Bluetooth standard, and the second timing may be included in a time section after the reception cycle.

According to an embodiment, the first and second timings may correspond to at least a part of a reception cycle defined by the Bluetooth standard.

According to an embodiment, the instructions, when executed, may cause the processor to determine a device for performing a function of a slave device for the first link among the electronic device and the first external electronic device while establishing the first link, and determine that the electronic device transmits the response message indicating the NACK at the first timing based on determining that the electronic device performs the function of the slave device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, the electronic device may reduce unnecessary resource consumption and a delay time for data processing in a Bluetooth network environment.

In addition, various effects that are directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a wireless communication circuit configured to support a Bluetooth network;
at least one processor; and
a memory,
wherein the memory is configured to store instructions that, when executed by the at least one processor, cause the electronic device to:
generate a first link with a first external electronic device based on the Bluetooth network,
generate a second link with a second external electronic device based on the Bluetooth network,
transmit information to the second external electronic device through the second link, the information being used by the second external electronic device to monitor the first link,
negotiate a timing for transmitting a response message to the first external electronic device with the second external electronic device based on at least one of functions of a master device and a slave device, a battery status of the electronic device and the second external electronic device, or a type of the response message, wherein the timing comprises a first timing and a second timing corresponding to a timing later than the first timing by a specified time,
receive a data packet from the first external electronic device, and
transmit the response message to the first external electronic device at the negotiated timing in response to receiving the data packet.

2. The electronic device of claim 1,
wherein the first timing corresponds to at least a part of a reception cycle defined by a Bluetooth standard, and
wherein the second timing corresponds to at least a part of a time section after the reception cycle.

3. The electronic device of claim 1, wherein the first timing and the second timing correspond to at least a part of a reception cycle defined by a Bluetooth standard.

4. The electronic device of claim 1, wherein the instructions, when executed by the at least one processor, further cause the electronic device to:
determine a device for performing a function of the master device for the second link among the electronic device and the second external electronic device while establishing the second link, determine that the electronic device transmits the response message at the second timing based on determining that the electronic device performs the function of the master device, and determine that the electronic device transmits the response message at the first timing based on determining that the electronic device performs the function of the slave device.

5. The electronic device of claim 1, wherein the instructions, when executed by the at least one processor, further cause the electronic device to:

determine that the electronic device transmits the response message at the second timing based on the transmitting of the information used to monitor the first link by the electronic device.

6. The electronic device of claim 1, wherein the instructions, when executed by the at least one processor, further cause the electronic device to:

transmit the response message indicating a negative acknowledgment (NACK) at the first timing, or transmit the response message indicating an acknowledgment (ACK) at the second timing to the first external electronic device based on the negotiated timing.

7. The electronic device of claim 1, wherein the instructions, when executed by the at least one processor, further cause the electronic device to:

transmit the information used to monitor the first link to the second external electronic device through an external server.

8. An electronic device comprising:

a wireless communication circuit configured to support a Bluetooth network;

at least one processor; and a memory, wherein the memory is configured to store instructions that, when executed by the at least one processor, cause the electronic device to:

generate a first link with a first external electronic device based on the Bluetooth network, receive information related to a second link generated between the first external electronic device and a second external electronic device from the first external electronic device, negotiate timing for transmitting a response message to the second external electronic device with the first external electronic device based on at least one of functions of a master device and a slave device, a battery status of the electronic device and the first external electronic device, or a type of the response message, wherein the timing comprises a first timing and a second timing corresponding to a timing later than the first timing by a specified time, attempt to receive a data packet transmitted from the second external electronic device by monitoring the second link based on at least a piece of the information related to the second link, refrain from transmitting the response message when the data packet is normally received, and transmit the response message indicating a negative acknowledgement (NACK) to the second external electronic device the negotiated timing.

9. The electronic device of claim 8, wherein the information related to the second link comprises at least one of address information, clock information or key information related to the second link, and wherein the instructions, when executed by the at least one processor, further cause the electronic device to:

determine a hopping channel of the second link based on the address information and the clock information, attempt to receive the data packet by monitoring the determined hopping channel through the wireless communication circuit, generate an access code corresponding to the second link based on the address information, and transmit the response message indicating the NACK including the access code to the second external electronic device.

10. The electronic device of claim 8, wherein the first timing is included in at least a part of a reception cycle defined by a Bluetooth standard, and wherein the second timing is included in a time section after the reception cycle.

11. The electronic device of claim 8, wherein the first timing and the second timing correspond to at least a part of a reception cycle defined by a Bluetooth standard.

12. The electronic device of claim 8, wherein the instructions, when executed by the at least one processor, further cause the electronic device to:

determine a device for performing a function of a slave device for the first link among the electronic device and the first external electronic device while establishing the first link, determine that the electronic device transmits the response message indicating the NACK at the first timing based on determining that the electronic device performs the function of the slave device, and determine that the electronic device transmits the response message indicating the NACK at the second timing based on determining that the electronic device performs the function of the master device.

* * * * *